(12) United States Patent
Fukui et al.

(10) Patent No.: US 6,482,337 B1
(45) Date of Patent: Nov. 19, 2002

(54) METHOD FOR EVALUATION OF ABRASION OF A FORMING MOLD

(75) Inventors: Shigenobu Fukui, Tokyo (JP); Mikio Nishijima, Tokyo (JP); Hiroyuki Suzuki, Tokyo (JP); Hiroyuki Kohno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/492,183

(22) Filed: Jan. 27, 2000

(30) Foreign Application Priority Data

Jan. 27, 1999 (JP) ............................. 11-018137
Jan. 13, 2000 (JP) ....................... 2000-004304

(51) Int. Cl.[7] ............................................. B29C 33/00
(52) U.S. Cl. ........................................ 264/39; 264/219
(58) Field of Search ................................... 264/39, 219

(56) References Cited

U.S. PATENT DOCUMENTS

| 4,520,062 A | * | 5/1985 | Ungar et al. ................. 156/230 |
| 4,589,831 A | * | 5/1986 | Weggel ....................... 425/195 |
| 5,391,924 A | * | 2/1995 | Uchida et al. ............... 257/789 |
| 5,535,980 A | * | 7/1996 | Baumgartner et al. ... 249/114.1 |

* cited by examiner

Primary Examiner—Allan R. Kuhns
(74) Attorney, Agent, or Firm—Oblon, Spivak, McClelland, Maier & Neustadt, P.C.

(57) ABSTRACT

In a method for evaluation of abrasion of a forming mold, abrasion amounts of divided pieces which are divided from a mold piece constituting a cavity are measured with the divided pieces removed or not removed from a forming mold body. A layer, a marking-off line or satin is formed on the surfaces of the divided pieces, which are observed visually every predetermined shot to judge a degree of abrasion of the respective divided pieces.

9 Claims, 23 Drawing Sheets

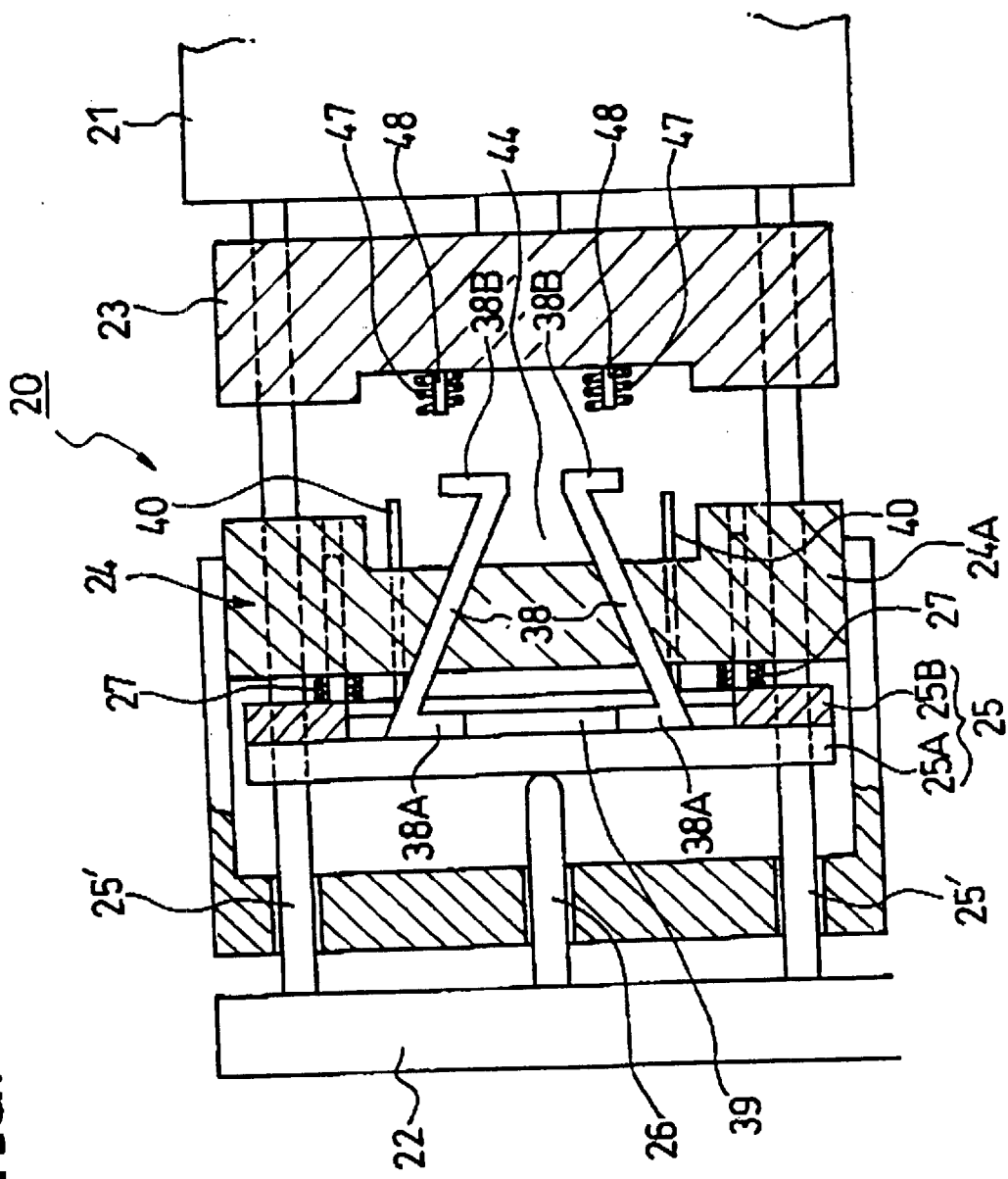

METHOD FOR EVALUATION OF ABRASION OF A FORMING MOLD

This application claims priority from Japanese Applications 11-018137, filed on Jan. 27, 1999 and 12-004304, filed on Jan. 13, 2000, the entire contents of which are hereby incorporated by reference.

BACKGROUND OF THE INVENTION

1. Field of the Invention

The present invention relates to a method for evaluation of abrasion of a forming mold, a production system for molded parts, and a forming mold for mass production, and more particularly, the invention relates to a method for evaluation of abrasion of a resin forming mold, a production system for resin molded parts, and a resin forming mold for mass productions

2. Description of the Related Art

In the forming mold for mass production of molded parts, injection molding for molded parts has been carried out by scores of thousands to hundreds of thousands of shots per unit. In the forming mold for mass production of this kind, the shots are repeated many times whereby the surface of the mold piece constituting a cavity for forming molded parts is worn by ejecting a forming raw material into the cavity. The cavity termed herein is a portion into which raw material is charged in the forming mold, and is a hollow place formed by a fixed mold and a movable mold.

In the case of a molded part having a complicated construction, the shape of the cavity is complicated corresponding to the shape of the molded part. Therefore, the surface of the mold piece or the surface portion thereof having a high resistance of a flowing molten raw material into the cavity is worn greatly. For example, where resin containing glass fiber or the like is used as the raw material, a degree of abrasion is very large.

When the surface of the mold piece becomes worn, an error occurs in dimension of a molded part produced thereby. To prevent this, in designing a mold, the number of shots of the molded parts that can be produced by the forming mold for mass production is planned and limited in advance.

In such a case as described, if the entire mold piece of the forming mold for mass production is abandoned after shotting of the planned number of the molded parts, it results in the waste of still usable part of the forming mold for mass production, therefore, the cost of the forming mold for mass production is highly reflected so that the cost of the molded parts increases.

In view of the foregoing, it is desired that abrasion of the mold piece is evaluated in advance. If a degree of abrasion of the surface of the mold piece can be grasped easily in advance, the result of the evaluation of abrasion can be utilized for the design of the mold piece of the forming mold for mass production, which is therefore desirable.

SUMMARY OF THE INVENTION

The subject of this invention is to provide a method for evaluation of abrasion of a forming mold, a production system for molded parts, and a forming mold for mass production, which enables the evaluation of a degree of abrasion of the surface of the mold piece easily and while avoiding an increase in cost.

For solving the above-described subject, according to a first aspect of this invention, there is provided a method for evaluation of abrasion of a forming mold, including a dividing step for dividing a mold piece into a plurality of divided pieces, where the mold piece constitutes a cavity for forming a molded part, and a judging step for judging an abrasion amount of a surface of each of the plurality of divided pieces, where the abrasion results from charging raw material into a cavity.

Thereby, the mold piece is divided into a plurality of pieces and the abrasion amount can be judged in unit of each divided piece. Therefore, there can be obtained an effect capable of easily grasping a progressing degree of abrasion of which part of the surface of the mold piece is large.

According to a second aspect of this invention, there is provided a method for evaluation of abrasion of the forming mold, wherein the abrasion amount of the surface of each of the plurality of the divided pieces is judged in a state where each of the divided pieces is removed from the forming mold body.

Thereby, there can be obtained an effect of measuring the abrasion amount of the removed divided pieces by a simple measuring instrument such as slide calipers, a micrometer and easily judging a progressing degree of abrasion.

According to a third aspect of this invention, there is provided a method for evaluation of abrasion of the forming mold, wherein the abrasion amount of the surface of each of the plurality of the divided pieces is judged in a state where each of said divided pieces is not removed from a forming mold body.

Thereby, since the abrasion amount can be judged without removing the divided pieces, there can be obtained an effect capable of achieving higher efficiency in terms of time and labor of the abrasion evaluation process. Further, there can be also obtained an effect of being free from occurrence of a mounting error in remounting because there is no steps of removing and remounting.

According to a fourth aspect of this invention, there is provided a method for evaluation of abrasion of the forming mold, wherein a layer having a predetermined thickness is formed on the surface of each of the divided pieces, and when the layer is disappeared, it is judged that the abrasion amount in excess of the predetermined thickness is present.

According to a fifth aspect of this invention, there is provided a method for evaluation of abrasion of the forming mold, including a forming step for forming a multi-layer composed of a plurality of layers having a predetermined thickness, respectively, and different colors on the surface of each of the divided pieces, and a judging step for judging the abrasion amount of the surface of each of the divided pieces from a change in color resulting from peeling of the respective layers of the multi-layer.

According to a sixth aspect of this invention, there is provided a method for evaluation of abrasion of the forming mold, wherein a first marking-off line having a predetermined depth is formed on the surface of each of the divided pieces, and when the first marking-off line is disappeared, it is judged that the abrasion amount in excess of the predetermined depth is present.

According to a seventh aspect of this invention, there is provided a method for evaluation of abrasion of the forming mold, wherein a second marking-off line having a deeper marking-off depth than the predetermined depth of the first marking-off line is formed on the surface of each of the divided pieces.

According to an eighth aspect of this invention, there is provided a method for evaluation of abrasion of the forming mold, wherein satin having a predetermined depth of rugged portions is formed on the surface of each of the divided pieces, and when the satin is disappeared it is judged that the abrasion in excess of the predetermined depth be present.

According to the fourth to eighth aspects of this invention, since the degree of abrasion of the surface can be grasped easily and quantitatively by viewing the surface of the mold piece, there can be obtained an effect capable of achieving higher efficiency in terms of time and labor of the abrasion evaluation process than in the third aspect.

Further, since in the seventh aspect, two kinds of marking-off lines different in depth are formed, there can be obtained an effect capable of judging the abrasion amount of higher accuracy from the state of disappearance of the marking-off line.

According to a ninth aspect of this invention, there is provided a method for evaluation of abrasion of a forming mold, including an examining step for examining dimensions of individual portions of a molded part to be formed from raw material charged into a cavity, and an evaluating step for evaluating thereby an abrasion amount of a surface of the mold piece for forming the molded part, the surface corresponding to a portion of each of the molded part.

Thereby, there can be obtained an effect capable of indirectly evaluating the degree of abrasion of the surface of the mold piece without removing the mold from the molding machine or removing the mold piece from the molding machine, and without forming the marking-off line or the layer on the mold piece.

According to a tenth aspect of this invention, there is provided a method for evaluation of abrasion of a forming mold, wherein the mold pieces of a forming mold for mass production are divided in accordance with the abrasion amount of divided pieces.

Thereby, there can be obtained an effect capable of planning a way of dividing the mold piece of the forming mold for mass production, materials for the mold piece, and the like on the basis of a quantitative, a qualitative or indirect degree of abrasion evaluation.

According to an eleventh aspect of this invention, there is provided a production system, including a preparing step for preparing a forming mold for test having a mold piece constituting a cavity for forming a molded part and evaluating an abrasion amount of a surface of the mold piece, the abrasion resulting from charging raw material into the cavity, evaluating step for evaluating the abrasion amount of the surface of the mold piece by carrying out a test shot by the forming mold for test, a fabricating step for fabricating a forming mold for mass production on the basis of a result of evaluation of the abrasion amount, and a molding step for molding the molded part using the forming mold for mass production.

According to a twelfth aspect of this invention, there is provided the production system, wherein the forming mold for mass production has a mold piece divided into a plurality of divided pieces on the basis of evaluation of the abrasion amount by the test shot, and the mold piece further constitutes a cavity for forming a molded part.

According to a thirteenth aspect of this invention, there is provided a production system, wherein replacing period for divided pieces is determined on the basis of the abrasion amount.

According to a fourteenth aspect of this invention, there is provided a production system, wherein replacing period is determined on the basis of the number of shot times.

According to a fifteenth aspect of this invention, there is provided a production system, wherein replacing period is determined on the basis of integrating time from a start of use of the forming mold for mass production.

According to a sixteenth aspect of this invention, there is provided a production system further including a disassembling step for disassembling the forming mold for mass production into divided pieces, a cleaning step for cleaning the surface of each divided piece by removing each of the divided pieces, a measuring step for measuring the abrasion amount of the surface of each divided piece, a sorting step for sorting the divided piece judged to be replaced on the basis of the result of measurement and a divided piece judged to be continuously usable, replacing step for replacing the divided piece judged to be replaced on the basis of the result of measurement with a new divided piece, and a reassembling step for reassembling the divided piece judged to be continuously usable and the new divided piece replaced on the forming mold for mass production.

According to a seventeenth aspect of this invention, there is provided a production system including an observing step for observing the abrasion state of the surface of each of the divided pieces without removing the divided pieces to visually conform the abrasion amount, and a removing step for removing only the divided piece judged to be replaced on the basis of the result of the visual confirmation from the forming mold for mass production to replace the divided piece judged to be replaced with a new divided piece.

According to the eleventh to seventeenth aspects, there can be obtained an effect that the process planning from the design of the forming mold for mass production to repairs thereof can be done systematically.

According to an eighteenth aspect of this invention, there is provided a forming mold for mass production, including divided pieces divided into a plurality of pieces according to an abrasion amount of a surface, the abrasion resulting from charging raw material into a cavity for forming a molded part.

Thereby, the replacement of only the greatly worn divided piece suffices, and accordingly, there can be obtained an effect that the service life of the mold for mass production can be extended, and the cost of the molded part can be reduced.

According to a nineteenth aspect of this invention, there is provided a forming mold for mass production, wherein replacing period for the divided pieces is determined on the basis of the abrasion amount.

Thereby, the greatly worn divided piece suffices to be removed every predetermined shot and replaced with other divided pieces remained mounted, thus obtaining an effect capable of saving trouble of replacing mold pieces.

According to a twentieth aspect of this invention, there is provided a forming mold for mass production, wherein the divided pieces are formed of materials different in hardness.

Thereby, a high-hardness material can be used for divided pieces, which are large in degree of abrasion to uniformly adjust a degree of abrasion of divided pieces, thus obtaining an effect capable of replacing the divided pieces at once. Further, a low hardness and inexpensive material can be selected for divided pieces, which are small in degree of abrasion, thus obtaining an effect of achieving the reduction in cost.

BRIEF DESCRIPTION OF THE DRAWINGS

The above and other objects, features and advantages of the present invention will become more apparent from the following description taken in connection with the accompanying drawings, in which:

FIG. 12 is a schematic view of operation of the forming mold for mass production for forming the molded part shown in FIG. 1, showing the state in which the forming mold for mass production is opened, and the state the molded part has already been ejected;

DESCRIPTION OF THE PREFERRED EMBODIMENTS

One embodiment of a method for evaluation of abrasion of a forming mold, a production system for molded parts, and a forming mold for mass production according to the present invention will be described hereinafter with reference to the drawings. In the present embodiment, a resin forming with resin used as a raw material will be described.

Figure 22A:
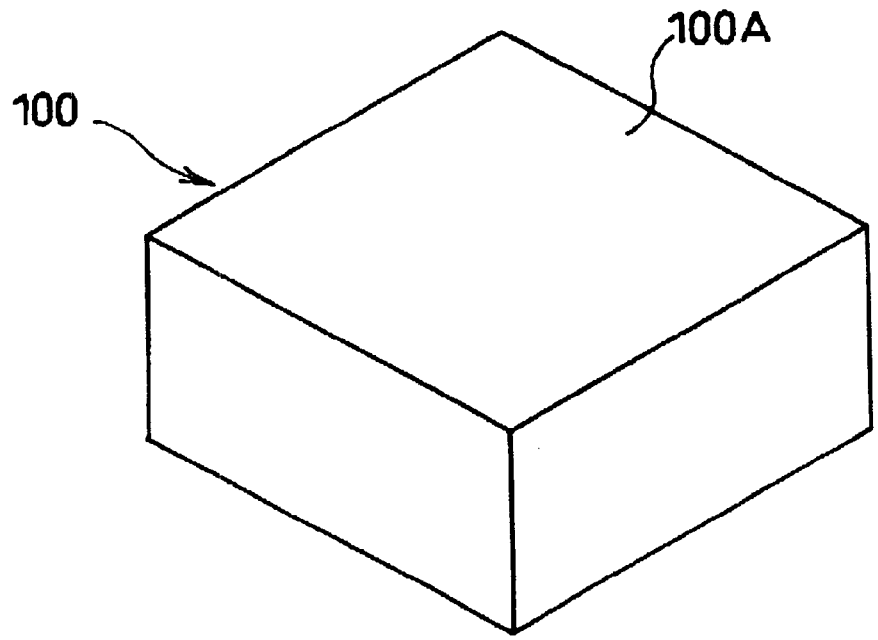
FIGS. 22(a) and 22(b) schematically show one example of the mold piece according to the present invention, FIG. 22(a) being a schematic external view of the mold piece of the forming mold for test shot, FIG. 22(b) being a schematic external view of the mold piece of the forming mold for mass production.

First, a forming mold for test for evaluating an abrasion amount is prepared. The forming mold for test has the mold piece 100 constituting a cavity for forming a resin molded part showing the schematic external appearance in FIG. 22(a). The test shot is repetitively carried out using the forming mold for test to evaluate the abrasion amount of the surface 100A of the mold piece 100 (See S.1 in FIG. 23).

Figure 22B:
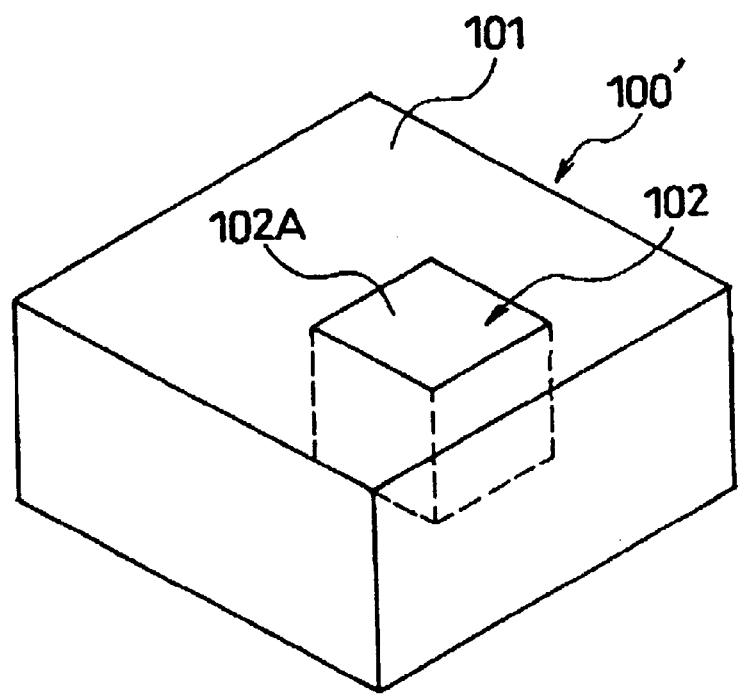
Figure 23:
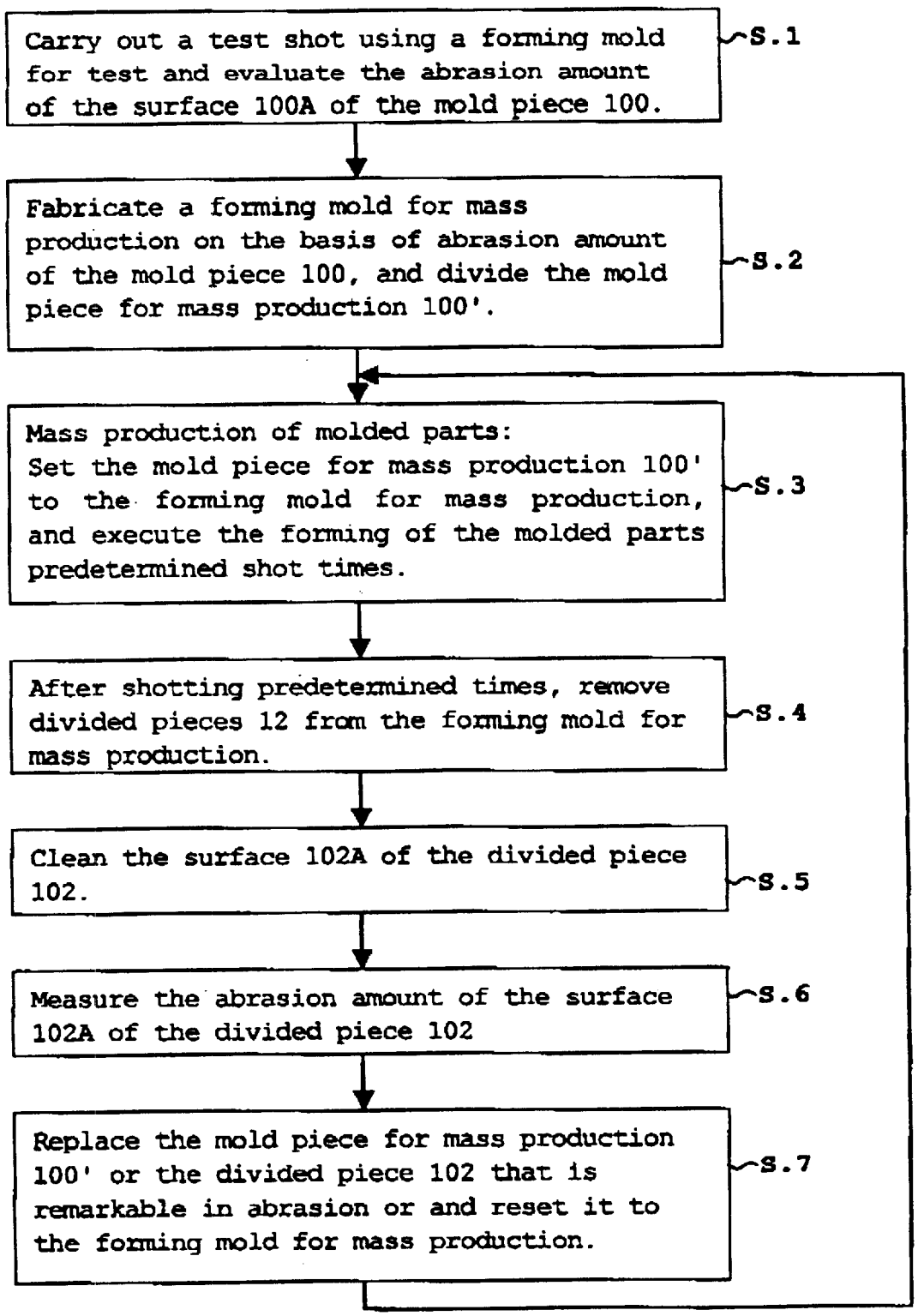
FIG. 23 is a flow chart showing one example of the step procedure for a production system of the molded part according to the present invention.

For fabricating the forming mold for mass production on the basis of the result of evaluation of the abrasion amount of the mold piece 100, the mold piece 100' of the forming mold for mass production is divided into a plurality of divided mold pieces 101 and 102 showing the schematic external appearance in FIG. 22(b) (See S.2 in FIG. 23).

The mold piece 100' constituted by the mold pieces 101 and 102 is set to the forming mold for mass production, and forming of the molded parts is carried out predetermined shot times (See S.3 in FIG. 23).

After completion of the shots in predetermined times, the forming mold for mass production is disassembled, and the divided piece 102 is removed from the forming mold for mass production (See S.4 in FIG. 23). The mounting construction of the divided piece 102 will be described later.

Next, the cleaning of the surface 102A of the divided piece 102 is carried out (See S.5 in FIG. 23). To this end, it is desirable that alcohol is used as a cleaning material in consideration of working environment, but thinner, acetone or the like are also sometimes used as the cleaner. These cleaners are coated on cloth to remove the resin adhered to the surface 102A of the divided piece 102. Thereby, the surface 102A is cleaned.

Then, the abrasion amount of the surface 102A of the divided piece 102 is measured (See S.6 in FIG. 23).

For measuring, there can be mainly used a surface roughness meter, a micrometer, a height gage or the like, but a pin gage, a pick age, slide calipers or the like can be also used according to the shape of the divided piece 102.

Where the abrasion of the divided piece 102 is remarkable, the entire mold piece 100' is removed, and a new mold piece 100' is set to the forming mold for mass production, or only the divided piece 102 is replaced with a new one, which is mounted on the divided piece 101 and set to the forming mold for mass production, the forming mold for mass production being reassembled (See S.7 in FIG. 23). The step is returned to the S.3 in FIG. 23 to repeat the mass production of molded parts. Note that for resin material for molded parts, for example, ABS or polycarbonate is used.

According to the method for evaluation of abrasion of the forming mold or the production system for molded parts in accordance with the present invention, only the mold piece or the divided piece which is remarkable in abrasion can be replaced with a new divided piece, and the entire forming mold can be used without replacement, thus achieving the reduction in cost of molded parts.

Figure 24:
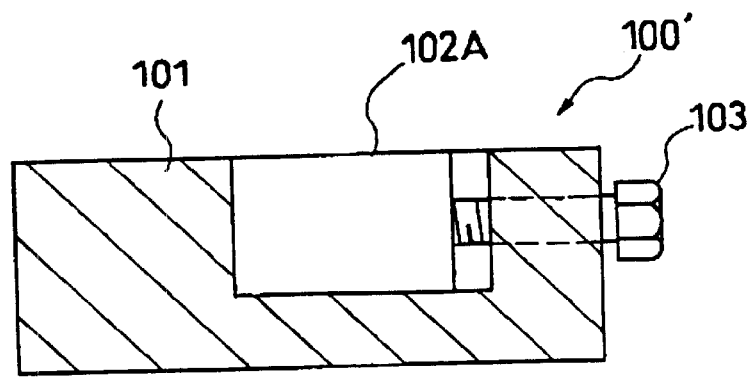
FIG. 24 is a view showing one example of the fixing method for the mold piece shown in FIG. 22(b)
Figure 25:
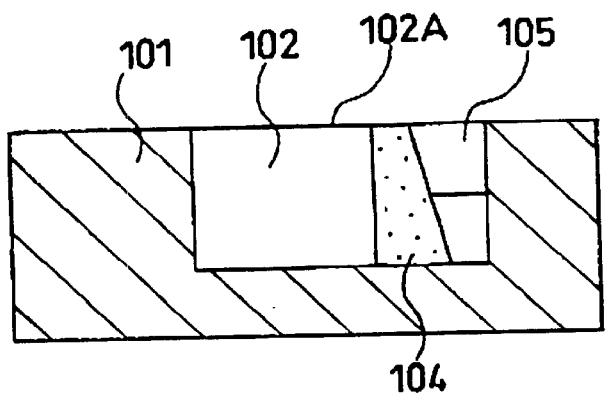
FIG. 25 is a view showing another example of the fixing method for the mold piece shown in FIG. 22(b)

The divided piece 102 may be fixed by pressing it against the divided piece 101 by means of a bolt 103, as shown in, for example, FIG. 24, and when the divided piece 102 is removed, or as shown in, for example, FIG. 25, wedge plates 104 and 105 are used, and the divided piece 102 is fixed to the divided piece 101 by means of the wedge plates 104 and 105, and when the divided piece 102 is removed, the plate 105 may held by a tool to remove it.

Figure 26:
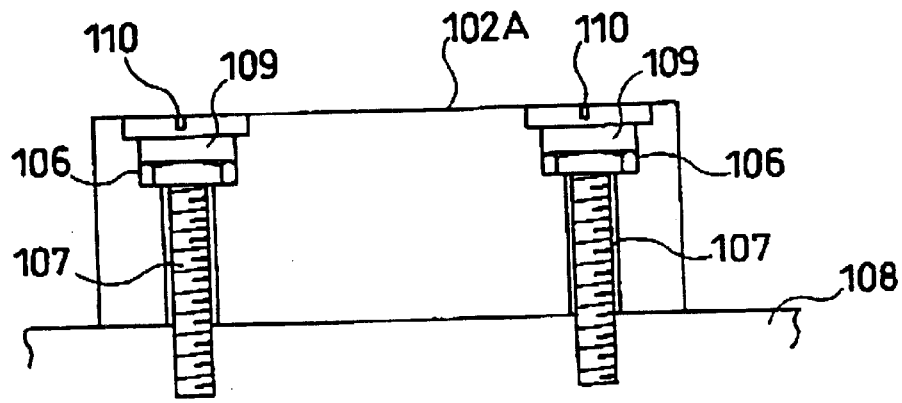
FIG. 26 is a view showing still another example of the fixing method for the mold piece shown in FIG. 22(b).

Further, as shown in FIG. 26, the divided piece 102 is formed with tapped holes on both corners thereof so that the divided piece 102 is fixed to the forming mold body for mass production 108 by means of bolts 107 through the tapped holes 106, and the topped holes 106 are closed later by lid members 109 formed at the piece portion with engaging grooves 110, and when the divided piece 102 is removed, the lid members 109 are removed by means of a screw driver or the like to assemble it.

While a description has been made here in which the divided piece is removed from the forming mold for mass production, and the abrasion amount of the divided piece is measured, it is to be noted that the abrasion state of the surface of the divided piece can be observed to visually confirm the abrasion amount, and only the divided piece judged to be replaced on the basis of the result of visual confirmation can be replaced with a new divided piece.

CONCRETE EMBODIMENTS OF THE INVENTION

One example of the molded part formed by the forming mold for mass production according to the present invention will be explained with reference to FIGS. 1 to 7 prior to entry into a description of the method for evaluation of abrasion of the forming mold and the forming mold for mass production of molded parts.

MOLDED PART FORMED BY FORMING MOLD FOR MASS PRODUCTION

Figure 1:
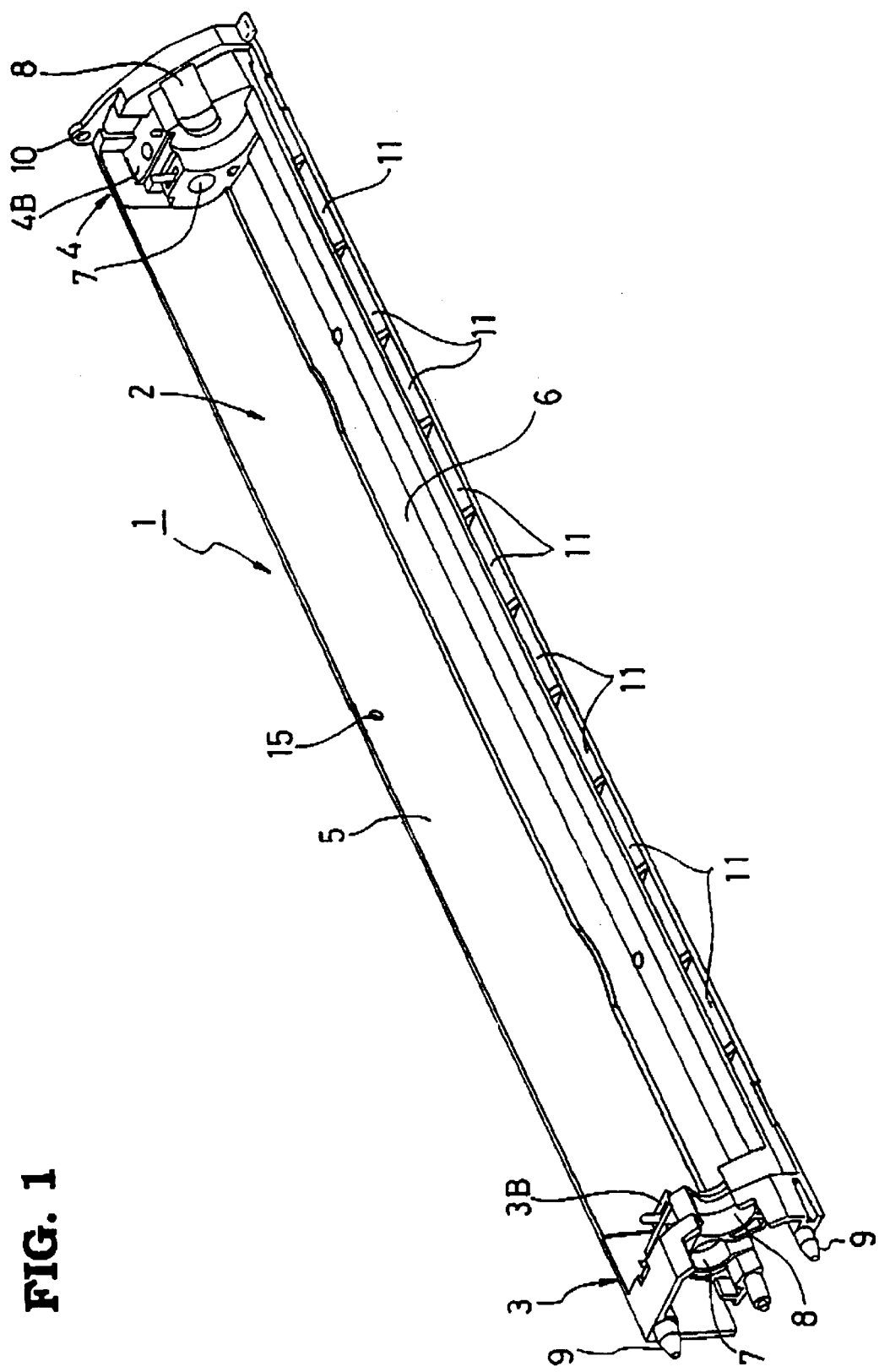
FIG. 1 is a perspective view schematically showing the entire constitution of one example of a molded part formed by a forming mold for mass production according to the present invention.

FIG. 1 is a perspective view schematically showing the entire constitution of one example of the molded part formed by the forming mold for mass production according to the present invention. This molded part is used as a bearing member of a toner supply mechanism of a developing unit. The molded part 1 has a lengthy complicated shape.

Figure 2B:
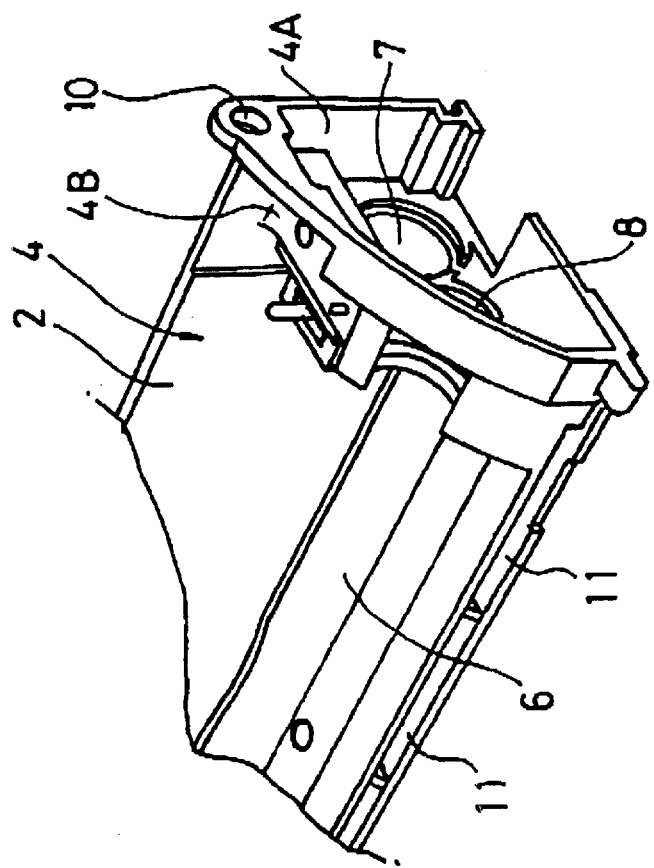
FIGS. 2(a) and 2(b) are respectively partial enlarged views of the molded part shown in FIG. 1, FIG. 2(a) being a partial enlarged perspective view showing the internal construction of a bearing portion on the left side in FIG. 1, FIG. 2(b) being a partial enlarged perspective view showing the external construction of a bearing portion on the right side in FIG. 1.
Figure 2A:
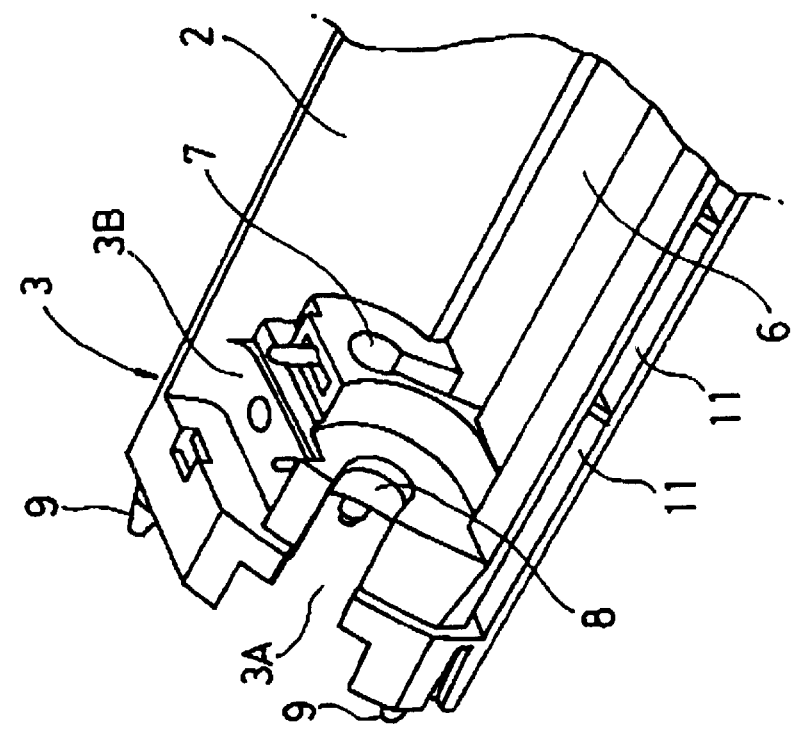
Figure 3A:
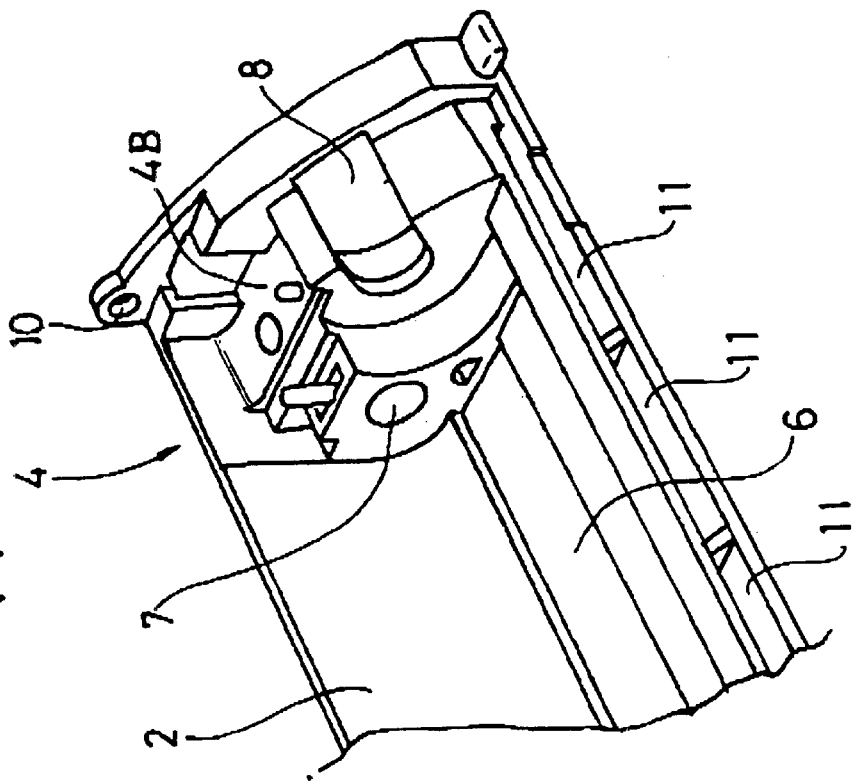
FIGS. 3(a) and 3(b) are respectively partial enlarged views of the molded part shown in FIG. 1, FIG. 3(a) being a partial enlarged perspective view showing the external construction of the bearing portion on the left side in FIG. 1, FIG. 3(b) being a partial enlarged perspective view showing the internal construction of the bearing portion on the right side in FIG. 1.
Figure 3B:
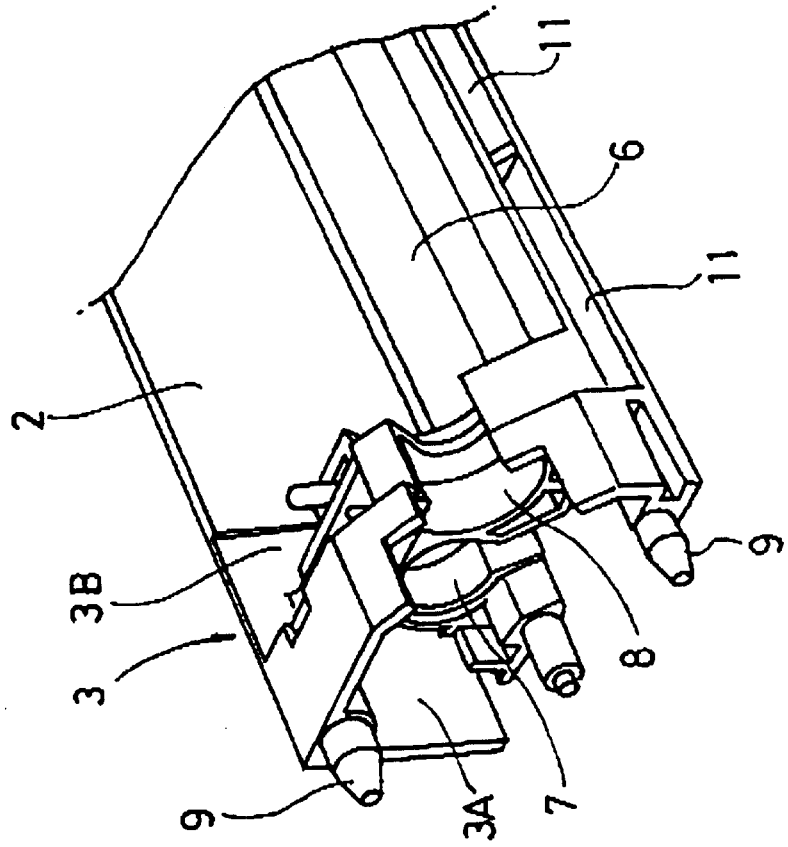

The molded part 1 has a mounting plate 2 extending in a longitudinal direction. Bearing portions 3, 4 are formed on both ends in the longitudinal direction of the mounting plate 2 as shown in a partial enlarged view of FIGS. 2 and 3. The molded part 1 is formed at the upper portion with an open space 5, and the molded part 1 is formed at the bottom with an opening 6 extending in a longitudinal direction. The bearing portions 3, 4 are provided with bearing recesses 3A, 4A, respectively, as shown in FIG. 2.

Figure 4A:
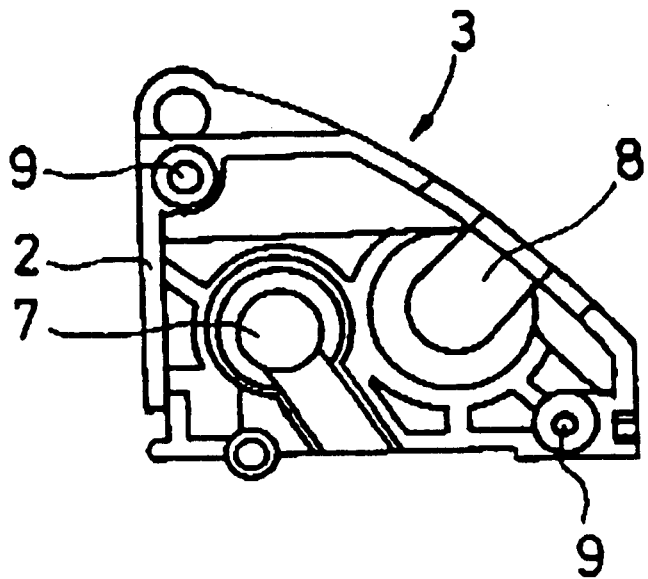
FIGS. 4(a) and 4(b) are respectively side views of the molded part shown in FIG. 1, FIG. 4(a) being a view of the left bearing portion in FIG. 1 from its left side, FIG. 4(b) being a view of the right bearing portion in FIG. 1 from its right side.
Figure 4B:
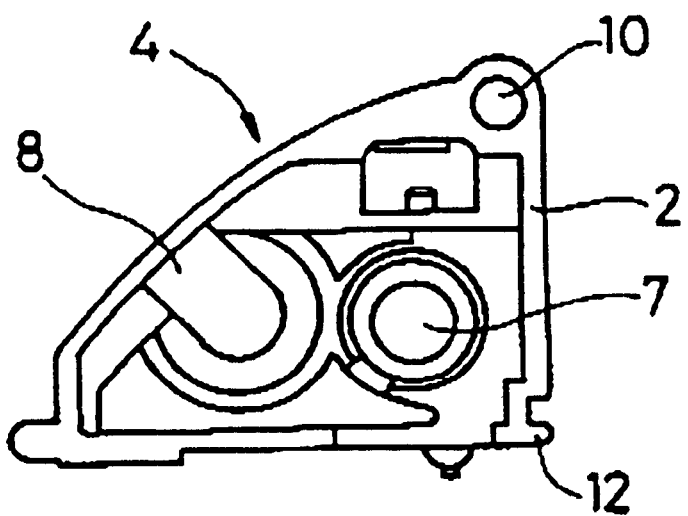

Bearing holes 7, 8 are formed in the bearing recesses 3A, 4A as shown in FIGS. 4(a), 4(b), respectively. The bearing portion 3 has locating projections 9, and the bearing portion 4 has a tapped hole 10.

Figure 5:
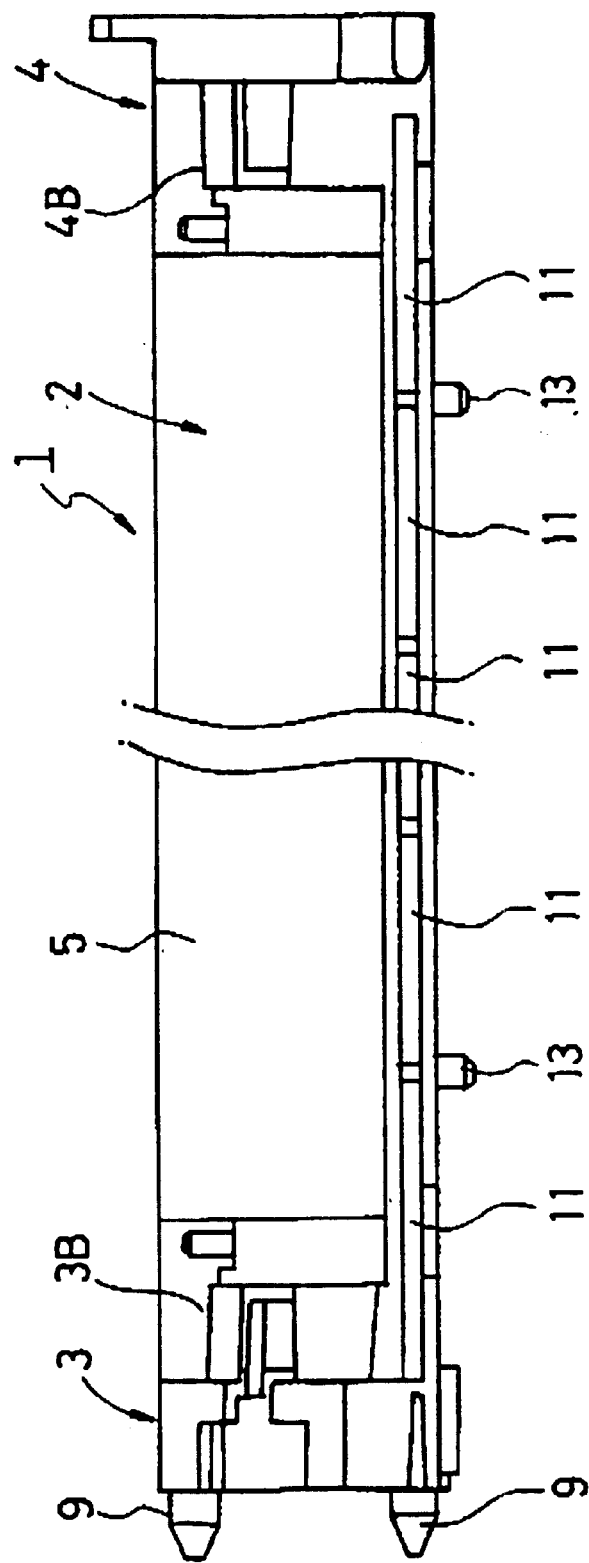
FIG. 5 is a front view of the molded part shown in FIG. 1.
Figure 6:
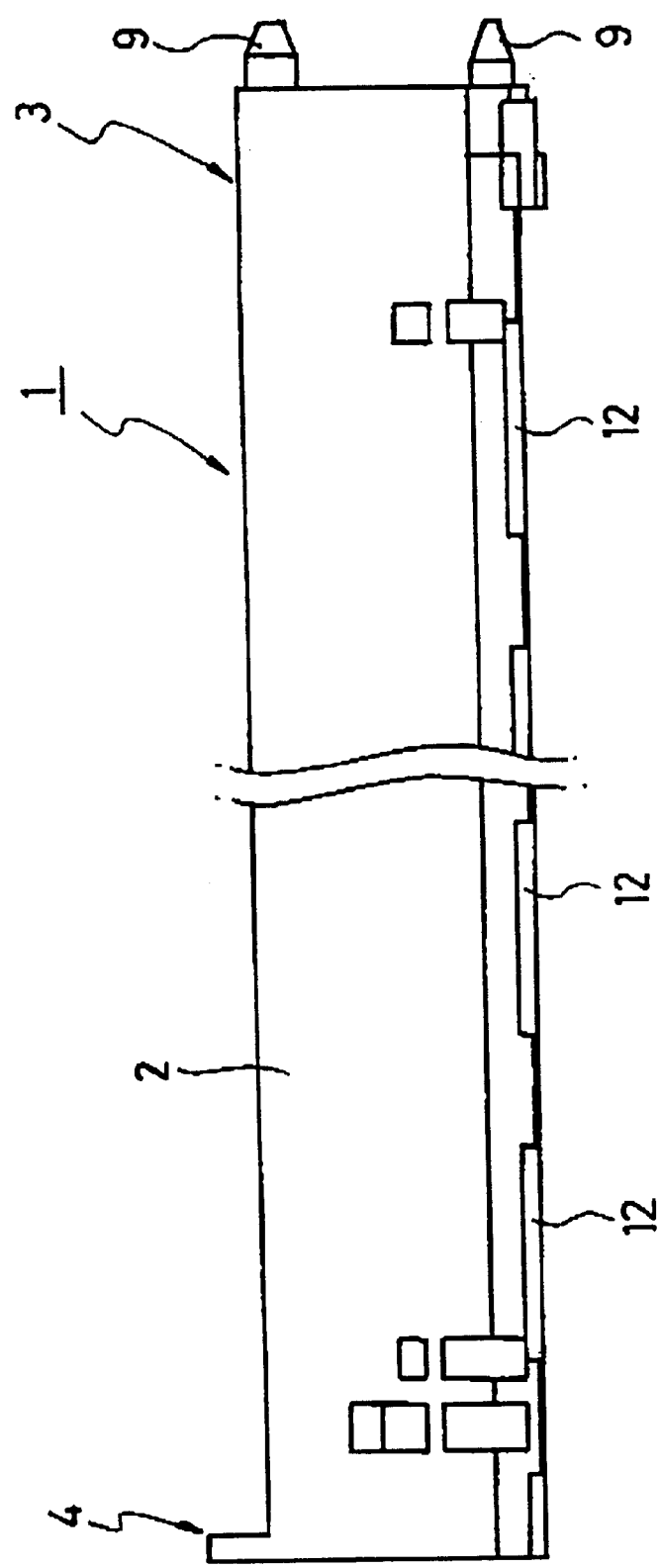
FIG. 6 is a back view of the molded part shown in FIG. 1.
Figure 7:
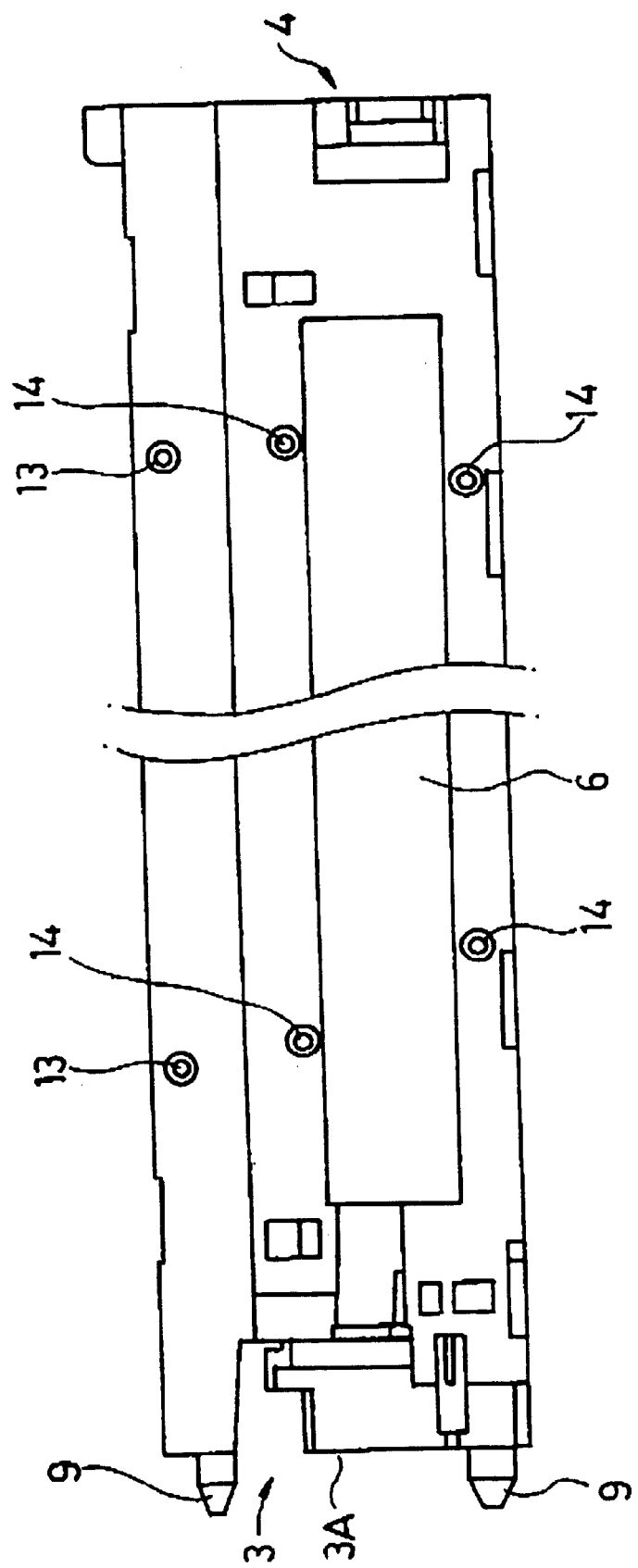
FIG. 7 is a bottom view of the molded part shown in FIG. 1.

The molded part 1 has holes for fitting 11 at its front bottom as shown in FIG. 5. Projections for fitting 12 are formed at the back bottom of the molded part 1 as shown in FIG. 6. Projections for engaging 13 are formed at the bottom of the molded part 1 as shown in FIG. 7. In this bottom are present a plurality of gate traces 14 generated when injection molding takes place using the forming mold for mass production which will be described later, as shown in FIG. 7. The mounting plate 2 is provided in the central upper portion with a tapped hole 15 as shown in FIG. 1. The tapped holes 10, 15 are used to insert mounting screws for fixing the molded part 1 to the body of the developing unit not shown.

Next, the forming mold for mass production 20 will be explained with reference to FIGS. 8 to 17.

FORMING MOLD FOR MASS PRODUCTION

Here, the forming mold for mass projection 20 is designed for double arrangement. With respect to the forming mold for mass production 20, parts or portions that seem to be necessary for understanding the present invention will be described mainly, and those that seem to have no direct relation with the present invention will be omitted in description.

FIGS. 8 to 13 is respectively schematic views for operation of the forming mold for mass production 20. In FIGS. 8 to 13, the molded part 1 is also schematically shown simplifying the shape thereof. In FIGS. 8 to 13, reference numeral 21 designates an injection molding machine body, and 22 a support base. The mold for mass production 20 is schematically composed of a fixed mold 23 and a movable mold 24 opposite to each other. The movable mold is guided along a guide rod 25'.

The movable mold 24 has an ejector plate 25. The ejector plate 25 is composed of plates 25A, 25B. The ejector plate 25 can be moved in a direction close to a movable mold body 24A by means of an ejecting rod 26 when the molded part 1 is ejected, and is urged in a direction away from the movable mold body 24A by means of a return spring 27.

Figure 14:
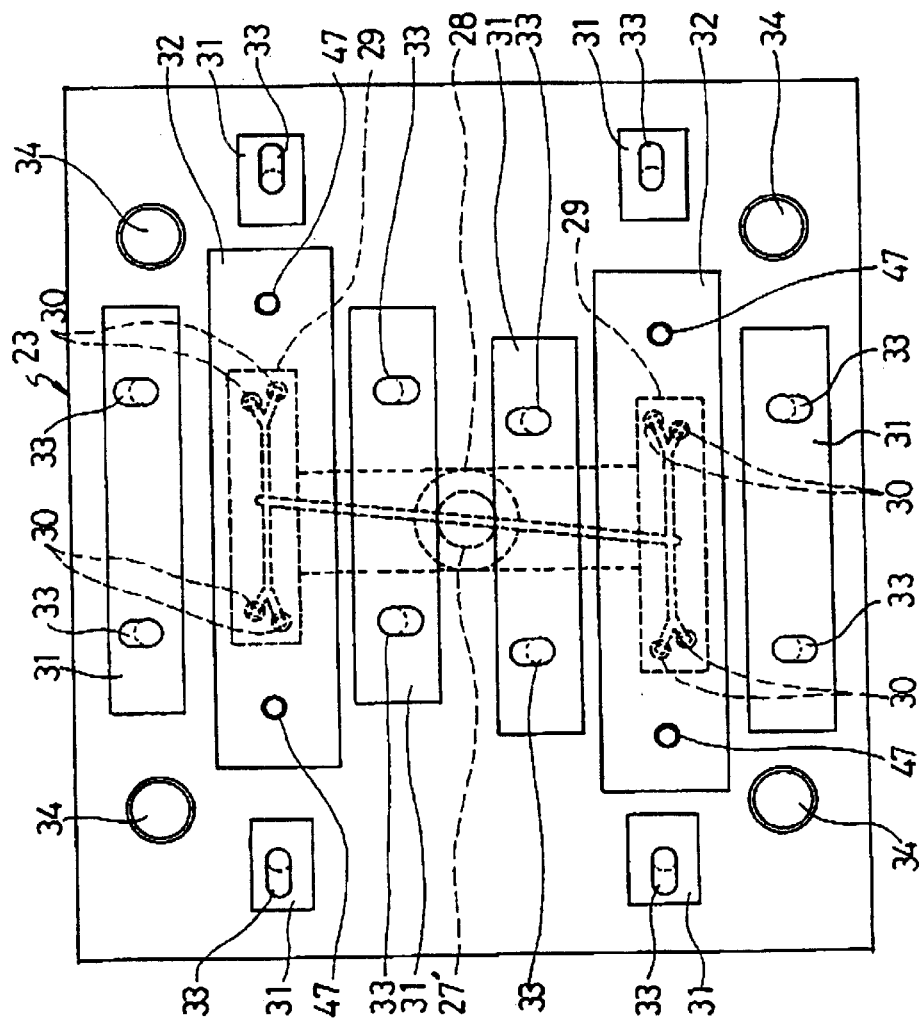
FIG. 14 is an enlarged plan view showing the schematic constitution of a fixed mold of the forming mold for mass production shown in FIGS. 8 to 13.

The fixed mold 23 has a sprue 27', runner plates 28, 29, gates 30, locking blocks 31, and fixed mold pieces 32. The locking block 31 is provided with an inclined pins 33. In FIG. 14, reference numeral 34 designates a guide hole into which the guide rod 25' is inserted.

Figure 15:
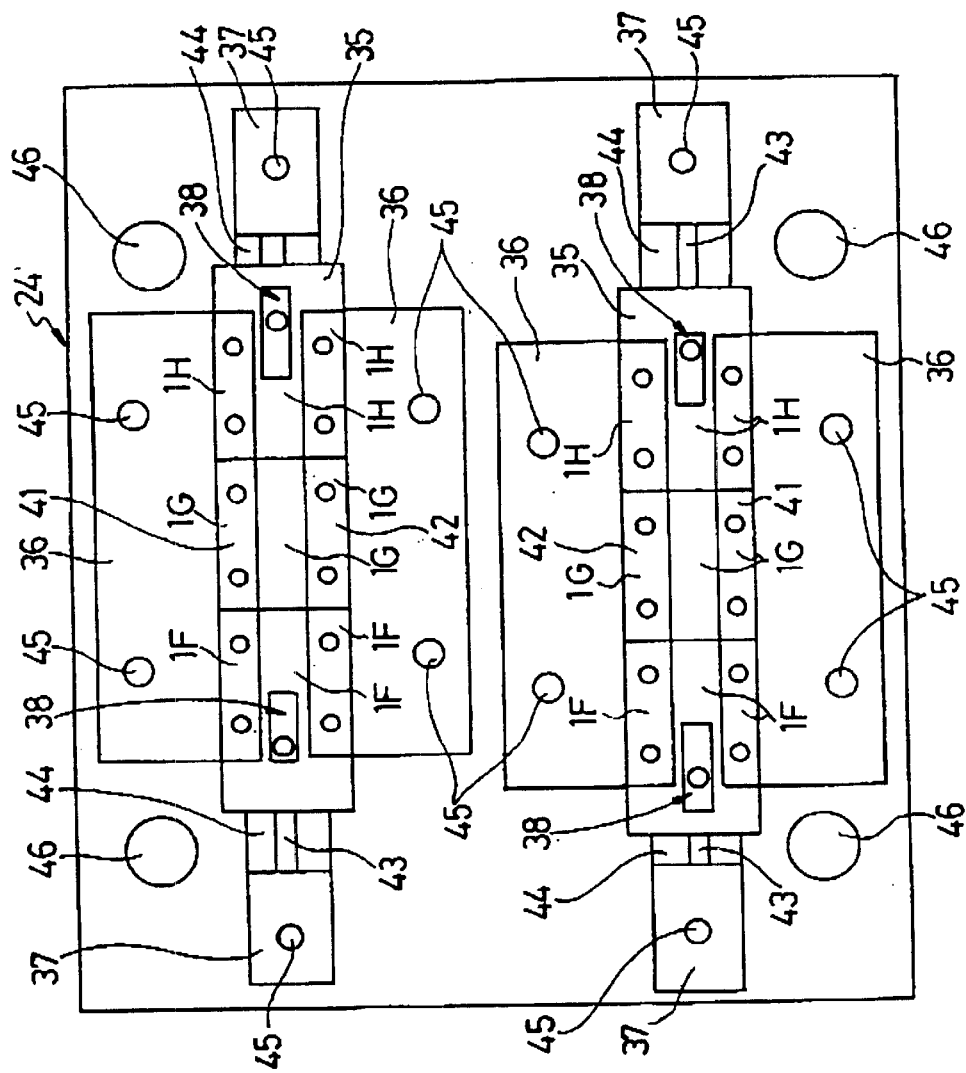
FIG. 15 is an enlarged plan view showing the schematic constitution of a movable mold of the forming mold for mass production shown in FIGS. 8 to 13.
Figure 16:
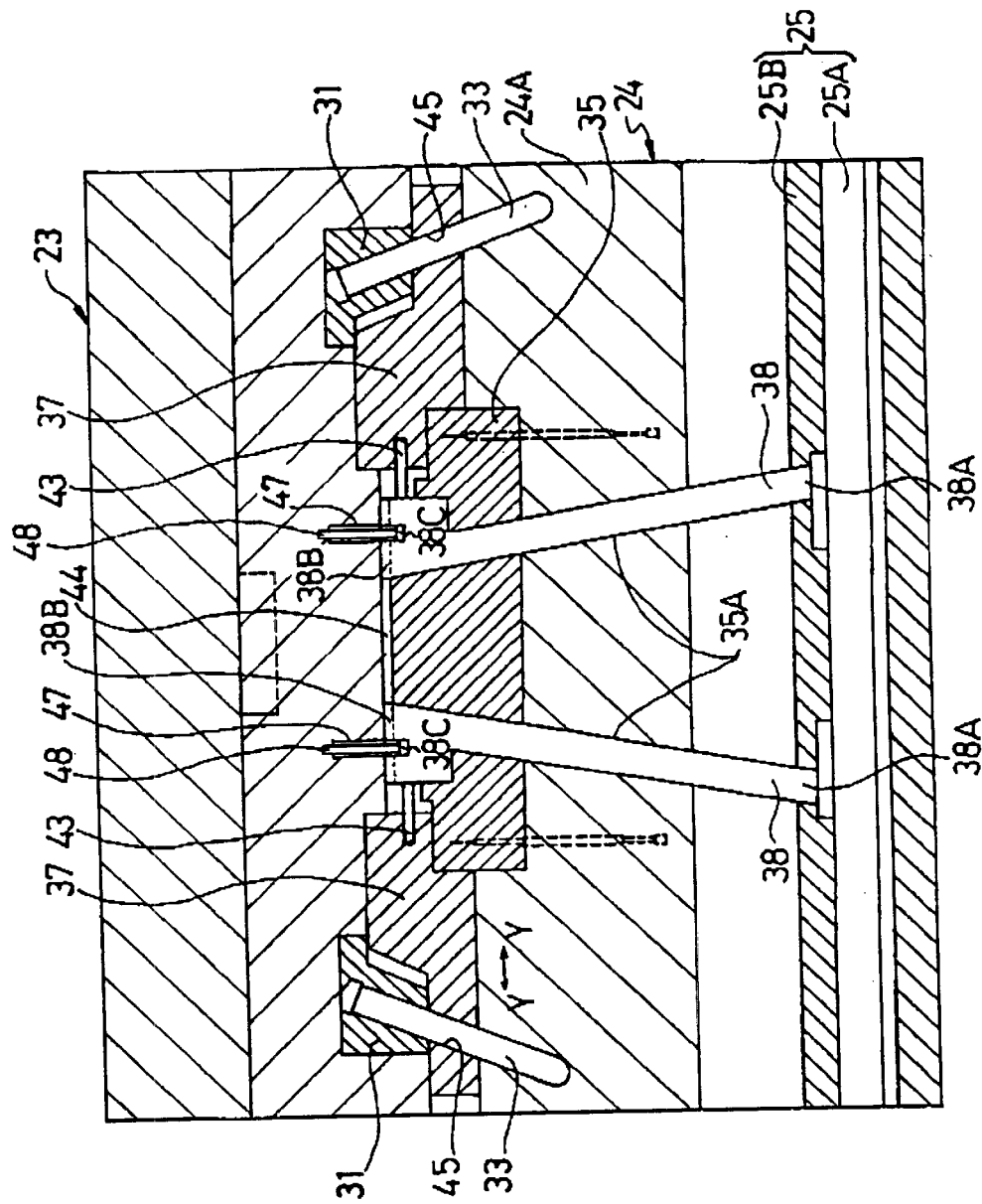
FIG. 16 is an explanatory view of the clamping state of the movable mold of the forming mold for mass production shown in FIGS. 8 to 13, being a sectional view in a longitudinal direction of the molded part.

The movable mold 24 has a fixed mold piece 35, and slide cores 36, 37 as shown in FIG. 15. The fixed mold piece 35 is provided with a pair of loose cores 38. Base portions 38A of the pair of loose cores 38 are formed on the ejector plate 25 as shown in FIG. 16. The plate 25B has a guide groove 39 as shown in FIGS. 8 to 13, and the movable mold body 24A and the fixed mold piece 35 are provided with inclined guide holes 35A. The ejector plate 25 is provided with an ejector pin 40 for ejecting the molded part.

Figure 17:
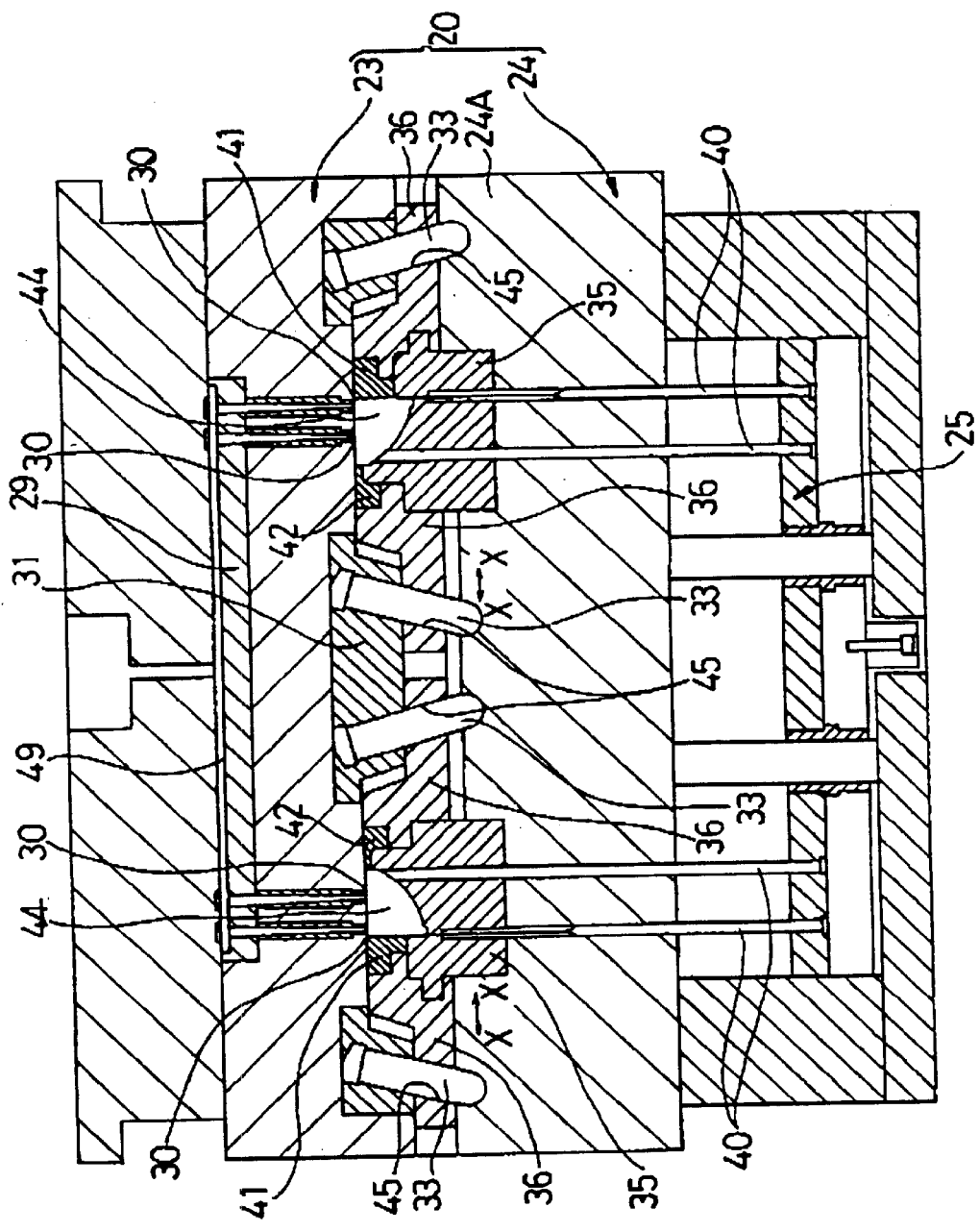
FIG. 17 is an explanatory view of the clamping state of the movable mold of the forming mold for mass production shown in FIGS. 8 to 13, being a sectional view in a direction perpendicular to the longitudinal direction of the molded part.

Slide mold pieces 41, 42 are fixed to the slide core 36 by means of fixing means such as screws, as shown in FIG. 17. The slide core 37 is provided with a bearing hole forming pins 43 as shown in FIGS. 15 and 16.

The fixed mold piece 35, the slide mold pieces 41, 42, the slide core 37 and the loose core 38 constitute a cavity 44 for forming the molded part 1 along with the fixed mold piece 32 of the fixed mold 23. The cavity 44 presents a complicated shape according to the shape of the molded part 1.

The slide cores 36, 37 have, as shown in FIG. 15, inclined fitting holes 45 into which the inclined pin 33 is fitted in clamping. The slide core 36 can be reciprocated in a direction perpendicular to the longitudinal direction of the molded part 1 (the direction of the arrow X—X shown in FIG. 17). And the slide mold pieces 41, 42 fixed respectively to the slide core 36 are operated in the direction close to the fixed mold piece 35 (the direction toward the center of the molded part 1) in clamping, while they are operated in a direction away from the fixed mold piece 35 (a direction away from the center of the molded part) in opening.

The slide core 37 can be reciprocated in a longitudinal direction of the molded part 1 (the direction of the arrow Y—Y shown in FIG. 16). And the slide core 37 is operated in the direction close to the fixed mold piece 35 (the direction toward the center of the molded part 1) in clamping, while the slide core 37 is operated in the direction away from the fixed mold piece 35 (the direction away from the center of the molded part 1) in opening. In FIG. 15, reference numeral 46 designates a guide hole into which the guide rod 25' is inserted.

The slide cores 37 are mainly used to form the bearing recesses 3A, 4A of the molded part 1, the bearing hole forming pins 43 are mainly used to form the bearing holes 7, 8 of the molded part 1, and the heads 38B of the loose core 38 are mainly used to form upper portions 3B, 4B (see FIGS. 1 to 3) and internal portions of the bearing portions 3, 4 of the molded part 1, respectively. The hole for fitting 11 to be an undercut in forming is mainly formed by the slide mold piece 41 fixed to the slide core 36, and the projection for fitting 12 to be an undercut portion in forming is mainly formed by the slide mold piece 42 fixed to the slide core 36.

The loose core 38 is operated in a direction of slipping out of the molded part 1 (the longitudinal direction of the molded part 1 and the direction toward the center of the molded part 1) in ejecting the molded part 1, and operated in a direction of projecting from the cavity 44.

The fixed mold piece 32 of the fixed mold 23 is provided with a press springs 47 for auxiliarily pressing the loose core 38 as shown in FIGS. 8 to 13, 14 and 16. Reference numeral 48 designates a bolt for fixing the press spring 47. The press spring 47 is allotted a role of pressing the loose core 38 into the cavity 44 in a state of contacting with the surface of the head 38B of the loose core 38.

The fixed mold piece 35 and the slide mold pieces 41, 42 are worn in their surfaces on the basis of the charge of the molten resin raw material into the cavity. The fixed mold piece 35 and the slide mold pieces 41, 42 are divided into a plurality of portions in the longitudinal direction of the molded part 1 according to a degree of abrasion of the surfaces. The method for evaluation of abrasion of the fixed mold piece 35 and the slide mold pieces 41, 42 will be described later.

A way of dividing the fixed mold piece 35 and the slide mold pieces 41, 42, and the number of divisions are suitably determined according to a degree of abrasion of the mold pieces. For example, as a material for the fixed mold piece 35 and the slide mold piece 42, as-rolled steel is used for parts which are less in abrasion, prehardened steel is used for parts which are much in abrasion, and hardened/temper steel is used for parts which are remarkable in abrasion. Further, surface treatments such as hard chrome plating, nickel steel plating and nitriding treatment are suitably carried out on the mold pieces according to a degree of abrasion. Here, the fixed mold piece 35 and the slide mold pieces 41, 42 are respectively divided into three parts in the longitudinal direction of the molded part 1 and are composed of three divided pieces 1F, 1G and 1H as shown in FIG. 15.

Figure 8:
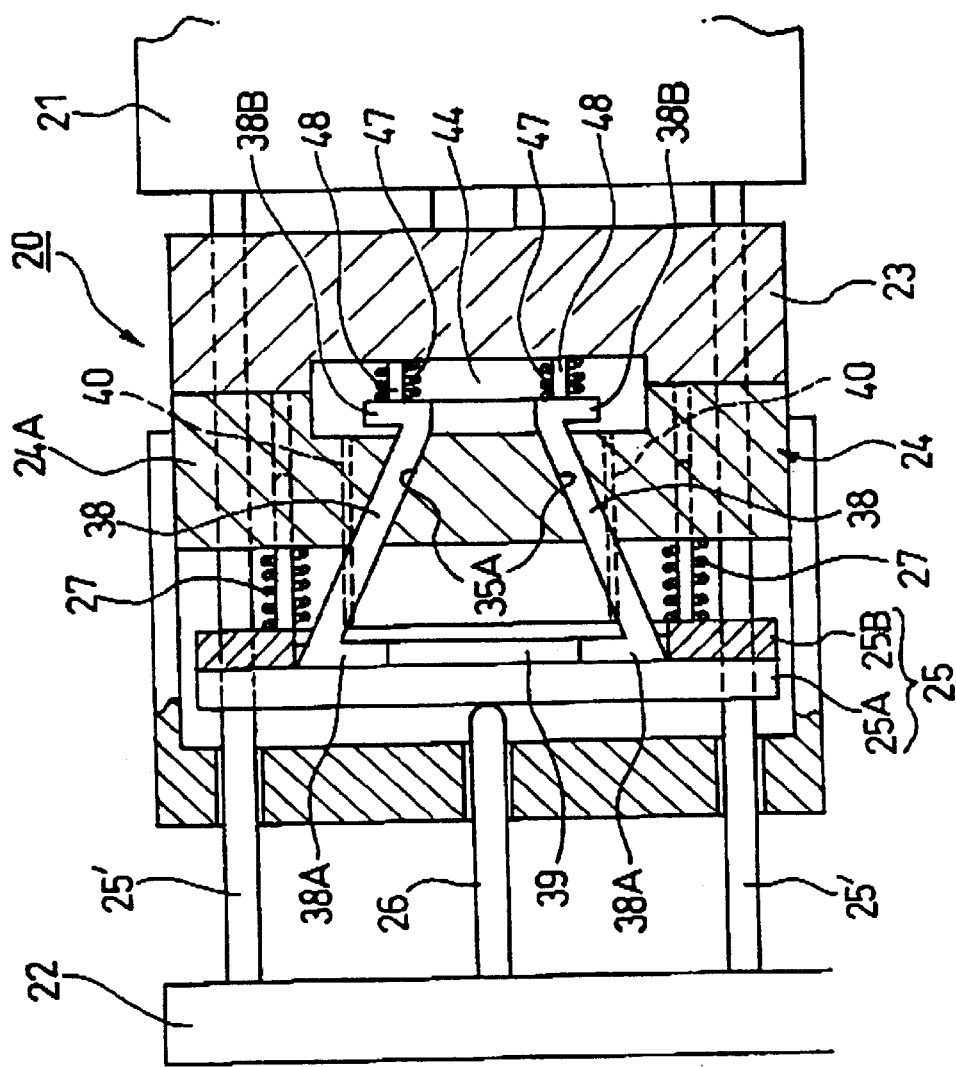
FIG. 8 is a schematic view of operation of the forming mold for mass production for forming the molded part shown in FIG. 1, showing the clamping state and the state before the molten resin raw material is charged.
Figure 9:
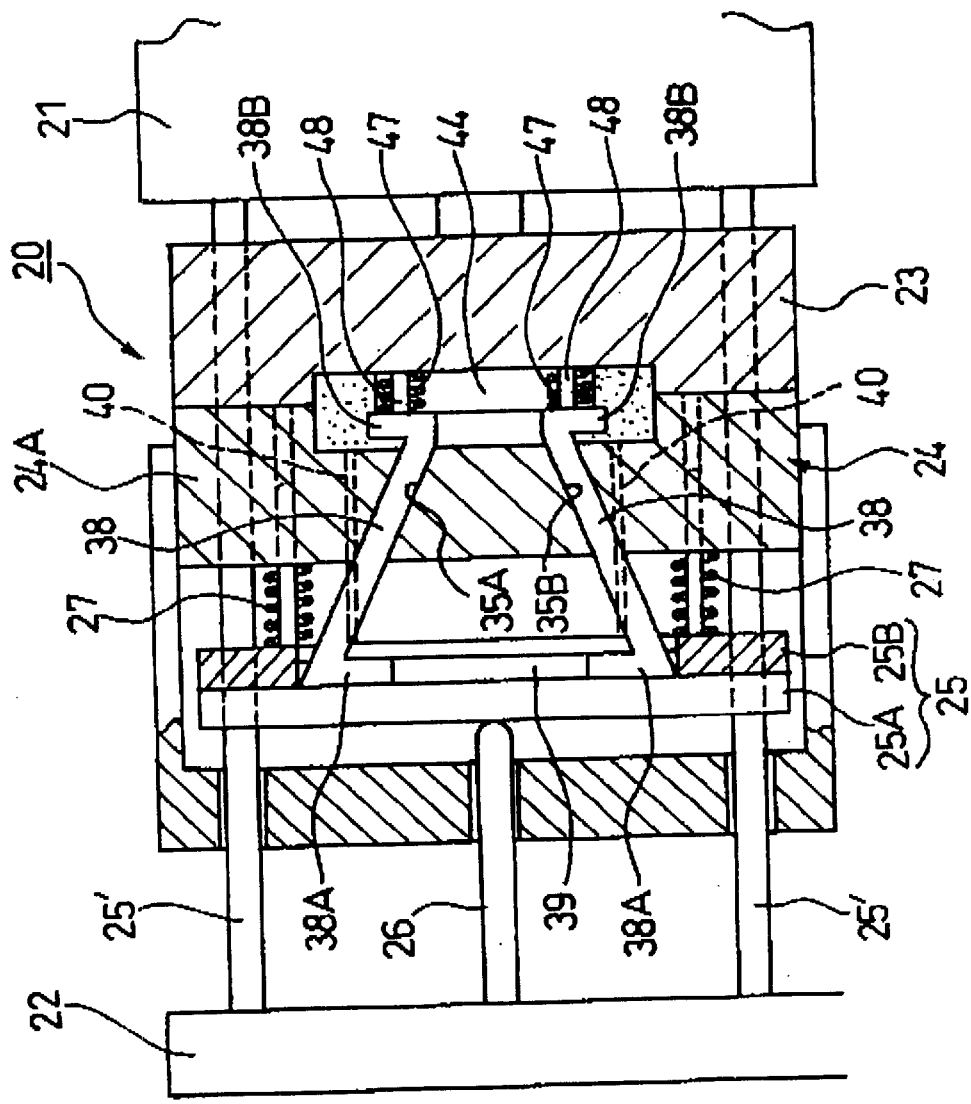
FIG. 9 is a schematic view of operation of the forming mold for mass production for forming the molded part shown in FIG. 1, showing the clamping state and the state in which the molten resin raw material is charged.

In the forming mold for mass production 20, glass fiber contained molten resin raw material is supplied from the side of the fixed mold 23, in the clamped state as shown in FIG. 8. The molten resin raw material is charged into the cavity 44 via the sprue 27', a runner 49 of the runner plates 28, 29 shown in FIG. 14. FIG. 8 shows the state in which the mold for mass production 20 is clamped, and before the charge of the molten resin raw material into the cavity 44. FIG. 9 shows the state in which the molten resin raw material is charged into the cavity.

Figure 10:
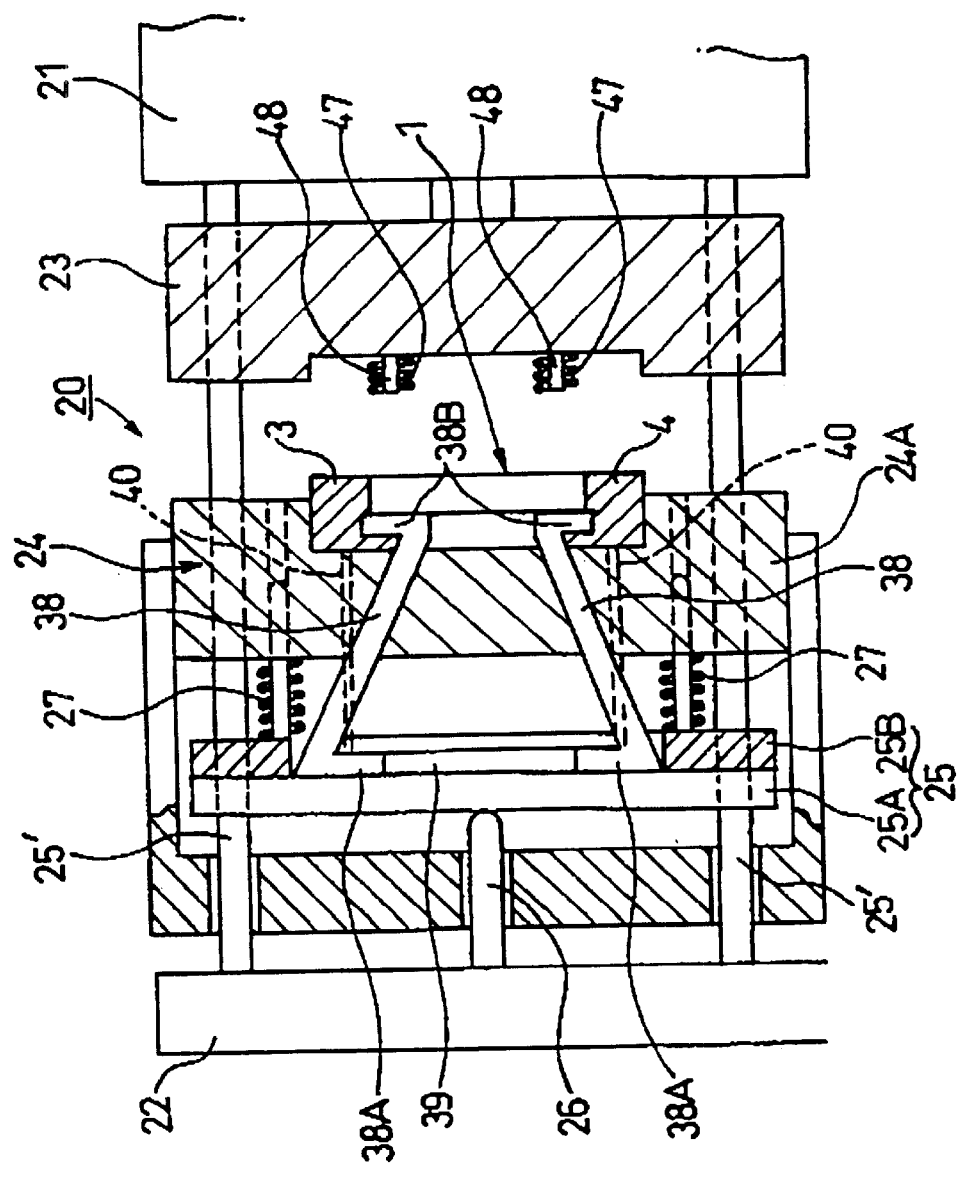
FIG. 10 is a schematic view of operation of the forming mold for mass production for forming the molded part shown in FIG. 1, showing the state in which the forming mold for mass production is opened, and the state far before the molded part is ejected.
Figure 11:
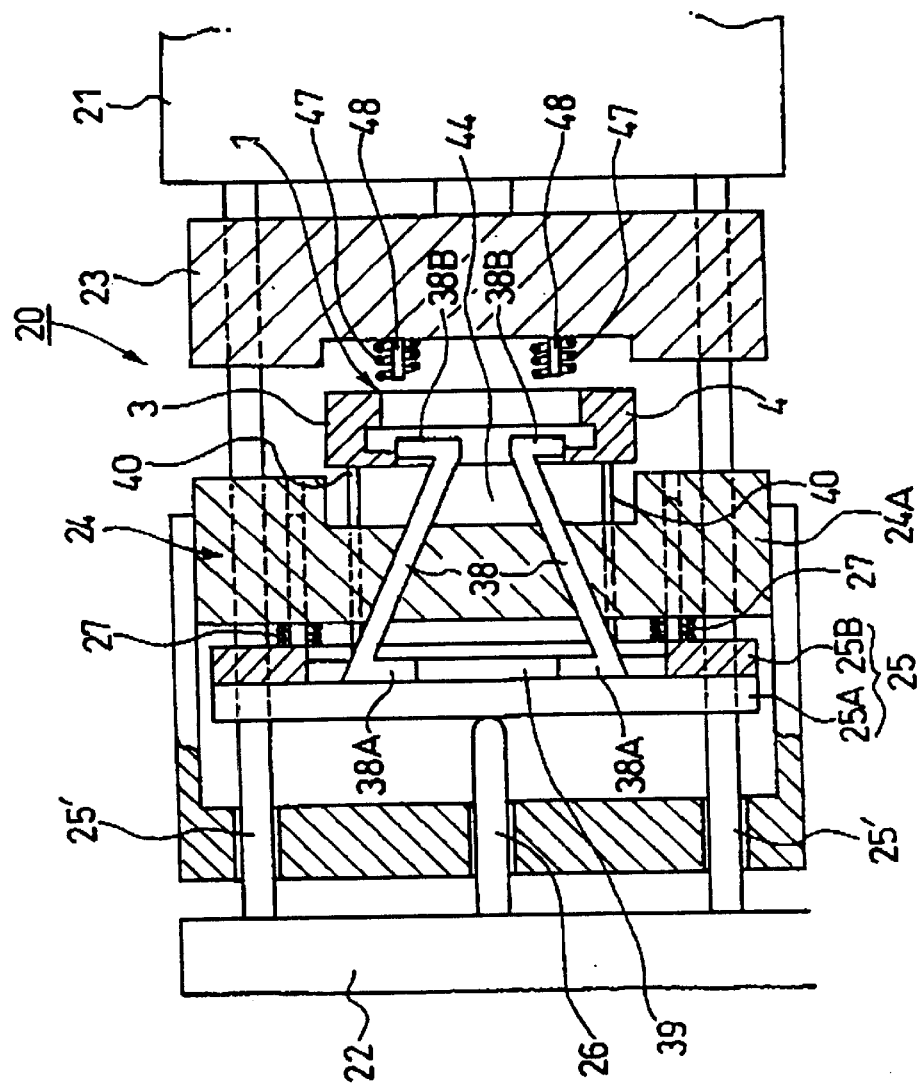
FIG. 11 is a schematic view of operation of the forming mold for mass production for forming the molded part shown in FIG. 1, showing the state in which the forming mold for mass production is opened, and the state immediately before the molded part is ejected.

The movable mold 24 is operated after passage of a predetermined time and is opened. FIG. 10 shows the state in which the mold for mass production 20 is opened, and the molded part 1 is still remaining in the movable mold 24.

In the state shown in FIG. 10, when the ejector plate 25 is operated in the direction close to the movable mold body 24A by the ejecting rod 26, both the pair of loose cores 38 are moved close to each other toward the center of the mold part 1 along the guide groove 39 while moving in the direction of projecting from the cavity 44. Thereby, the head 38B of the loose core 38 is disengaged from the upper portions 3B, 4B of the bearing portions 3, 4, and at the same time, the molded part 1 is extruded from the cavity 44 by the ejector pin 40 and ejected.

Figure 13A:
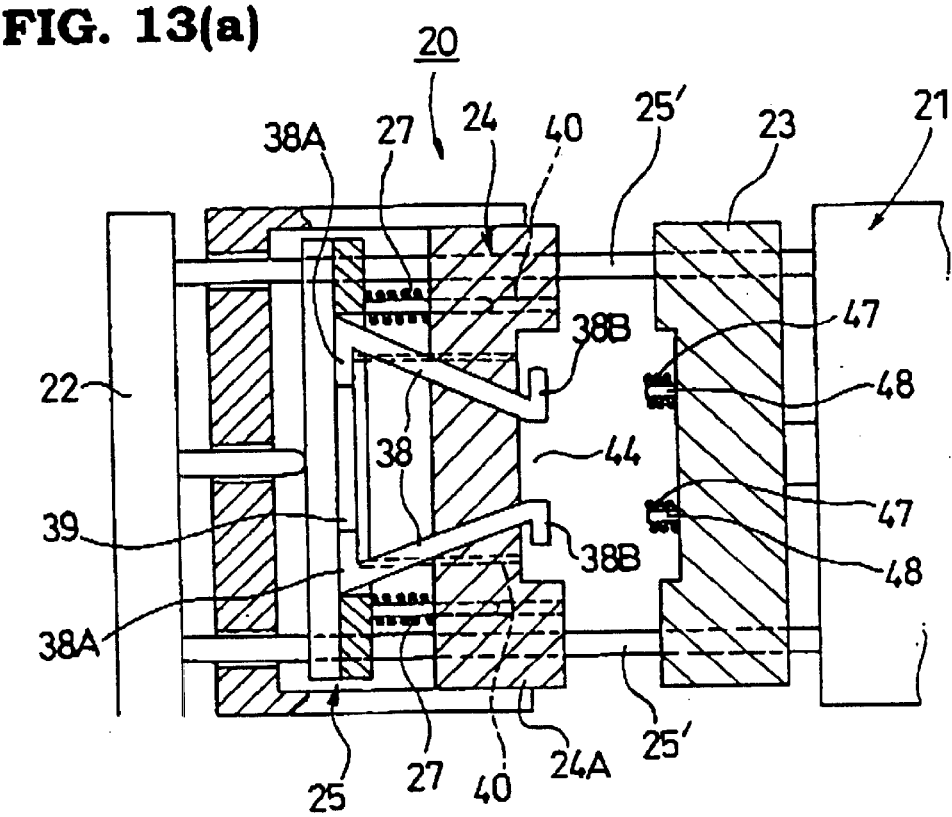
FIGS. 13(a) and 13(b) are respectively schematic views of operation of the forming mold for mass production for forming the molded part shown in FIG. 1, showing the state in which the forming mold for mass production is opened, and an ejector plate is returned, FIG. 13(a) being an explanatory view in the case where a loose core is normally returned into the cavity, FIG. 13(b) being an explanatory view in the case where the loose core is broken and is not normally returned into the cavity.

Immediately after the molded part 1 has been ejected, the loose core 38 is in the projecting state as shown in FIG. 12. When the ejecting rod 26 is withdrawn, the ejector plate 25 is operated in the direction away from the movable mold body 24A as shown in FIG. 13(a). Then, the operation of the ejector plate 25 is accompanied by sinking of the loose core 38 into the cavity 44.

Figure 13B:
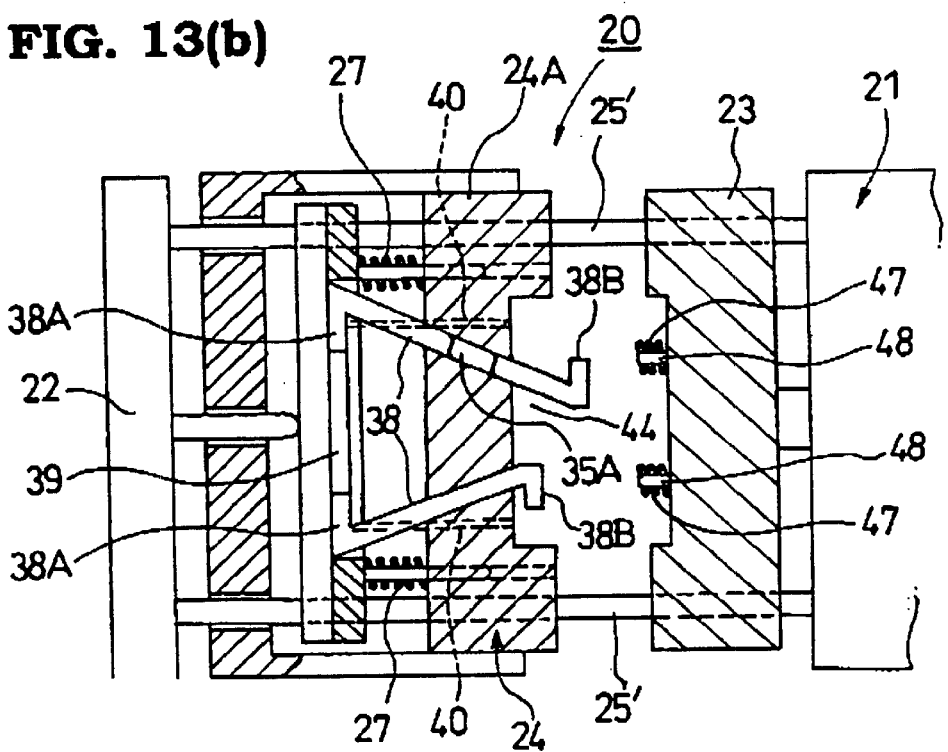

However, in the case where a part of the loose core 38 is broken, as shown in FIG. 13(b), even if the ejector plate 25 is operated in the direction away from the movable mold body 24A and returned to the original position, the head 38B of the loose core 38 remains projecting from the cavity 44. Even remained in the state shown in FIG. 13(b), in the forming mold 20 for mass production, by the operation of the movable mold 24 in the clamping direction, the press spring 47 comes in contact with the extreme end 38B of the loose core 38 to move the loose core 38 in the direction of pressing into the cavity 44. Therefore, even in the case where the loose core 38 is broken due to fatigue or the like, the entire mold can be prevented from destruction.

In the forming mold for mass production 20, since only the divided piece which is remarkable in abrasion can be replaced, the service life of the forming mold for mass production 20 can be extended, and the cost of the molded part 1 can be reduced. Further, to grasp the relation between the number of shots of the molded part 1 and the abrasion amounts of the divided pieces 1F to 1H in advance enables the easy determination of replacing period of the divided pieces 1F to 1H. In doing so, the divided pieces which are remarkable in abrasion can be removed every number of predetermined shot, while other divided pieces 1F to 1H remain mounted on the mold body, thus making it possible to save trouble of replacement of the mold piece.

Further, the divided pieces 1F to 1H can be formed from materials different in hardness so that the replacing periods of the divided pieces 1F to 1H can be the same, and the abrasion degrees of the divided pieces 1F to 1H can be adjusted so as to be uniform. This enables the replacement of the divided pieces 1F to 1H at the same time. And the material which is low in hardness and inexpensive can be selected for the divided piece which is small in abrasion degree. This makes it possible to reduce the cost.

For the standard of judgment of the replacing period, the number of shots may be used as described above, or the integrated time from start of use of the forming mold for mass production may be used.

CONCRETE EXAMPLE OF METHOD FOR EVALUATION OF ABRASION OF FORMING MOLD

A forming mold as a mother die (a forming mold for test) is fabricated before the forming mold for mass production 20 is fabricated. This forming mold has the same constitution as that of the forming mold for mass production 20 except for the number of divisions and the way of division of the fixed mold piece 35 and the slide mold pieces 41, 42, and the materials used for the mold pieces 35, 41, 42.

Figure 18:
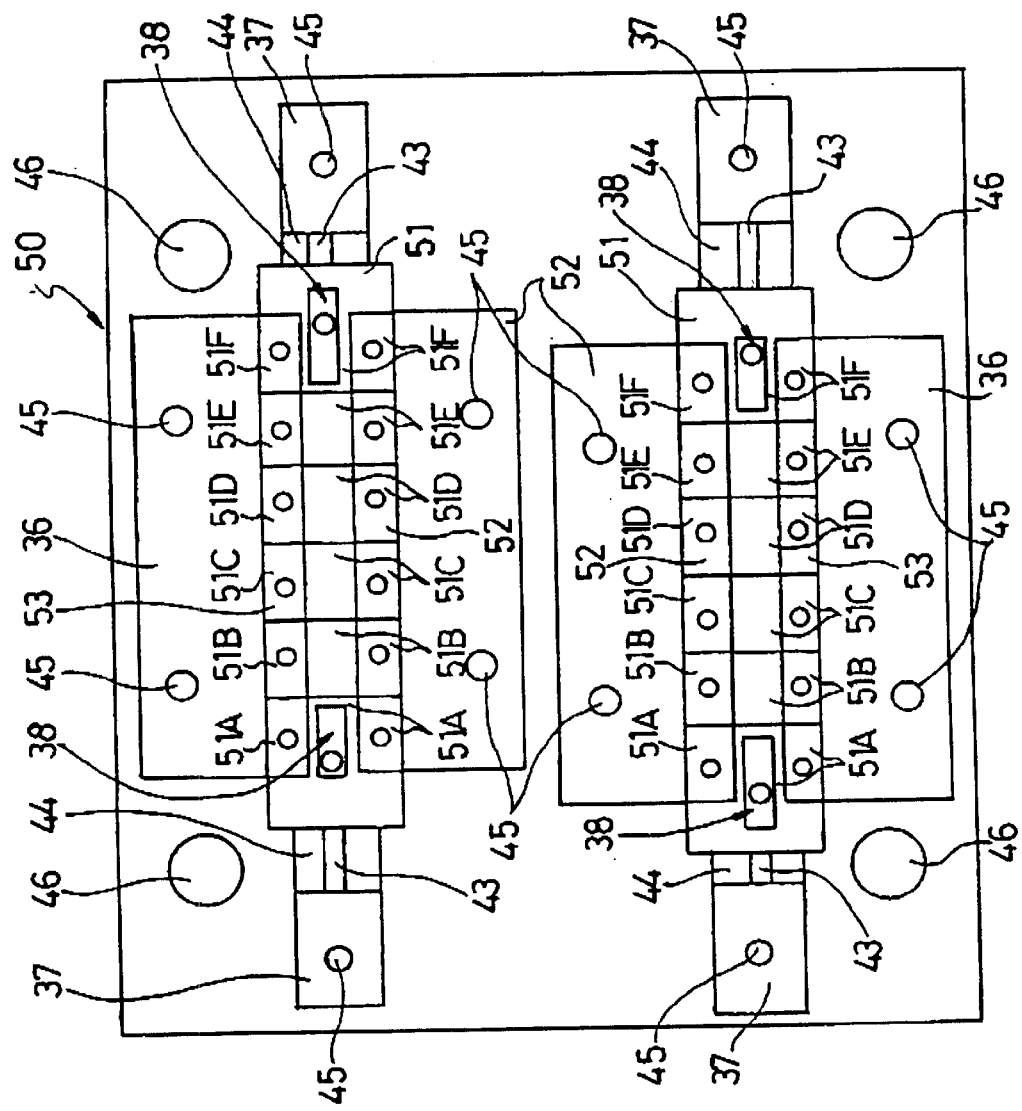
FIG. 18 is a plan view showing a movable mold of a forming mold (a forming mold for test) of a mother die.
Figure 19:
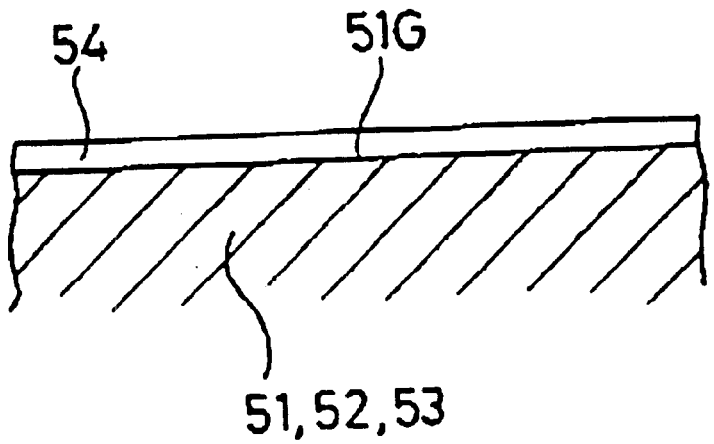
FIG. 19 shows a second example of a method for evaluation of the mold piece, being a partial sectional view of the mold piece in which a layer having a predetermined thickness is formed on the surface.

FIG. 18 shows the movable mold of the forming mold as a mother die (the forming mold for-test). In FIG. 18, reference numeral 50 designate a movable mold, 51 a fixed mold piece, and 52, 53 slide mold pieces. The mold pieces 51 to 53 are divided into six portions respectively in the longitudinal direction of the molded part. Reference numerals 51A to 51F show divided pieces.

Each of the divided pieces 51A to 51F is removed from the movable mold 50 every number of predetermined shot, and the abrasion amount is measured by the measuring means described above. In this manner, when the mold pieces are divided into a plurality of portions to evaluate the progressing degree of abrasion of each of the divided pieces 51A to 51F, it is possible to easily grasp the progressing degree of abrasion is large at which part of the surfaces of the divided pieces 51A to 51F.

Figure 20:
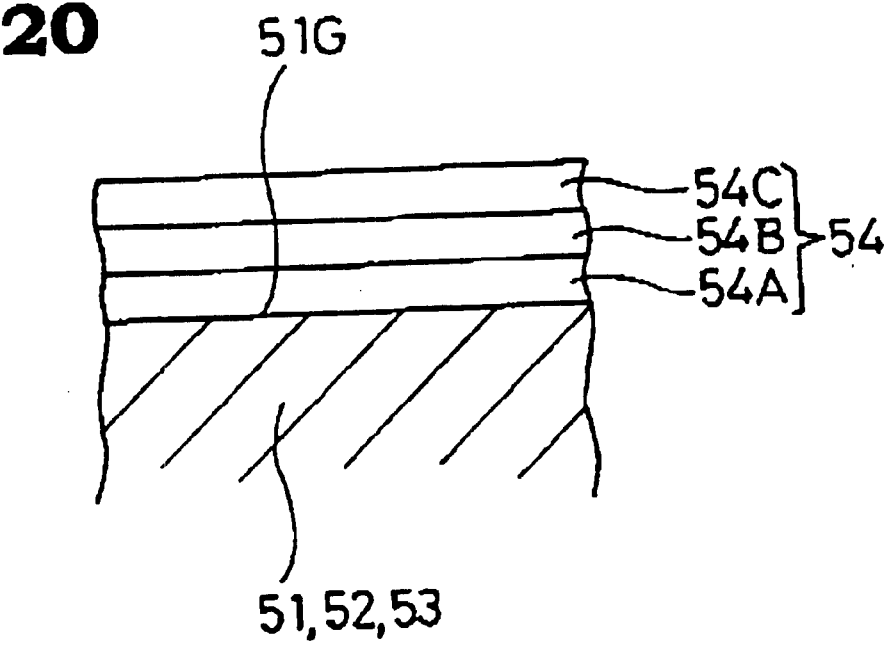
FIG. 20 shows a third example of a method for evaluation of the mold piece, being a partial sectional view of the mold piece in which a multi-layer composed of three layers each having a thickness of 5 a m and being different in color is formed on the surface.

Alternatively, a layer 54 is formed on the surface 51G of the mold pieces 51 to 53 to observe a degree of peeling of the layer 54 whereby the abrasion amount of the surfaces 51G of the pieces 51 to 53 resulting from the charge of forming resin into the cavity 44 may be evaluated. Further, as shown in FIG. 20, the layer 54 is formed by multi-layer composed of three layers 54A to 54C having a thickness of 5 $\mu$m each and different in color, and thereby the abrasion amounts of the surfaces 51G of the mold pieces 51 to 53 can be measured with high accuracy in every 5 $\mu$m from the change in color resulting from peeling of the respective layers.

By the constitution as described above, the surfaces 51G of the mold pieces 51 to 53 are visualized to easily grasp the abrasion degree of the surfaces 51G quantitatively without removing the mold pieces 51 to 53 from the movable mold 50.

Figure 21A:
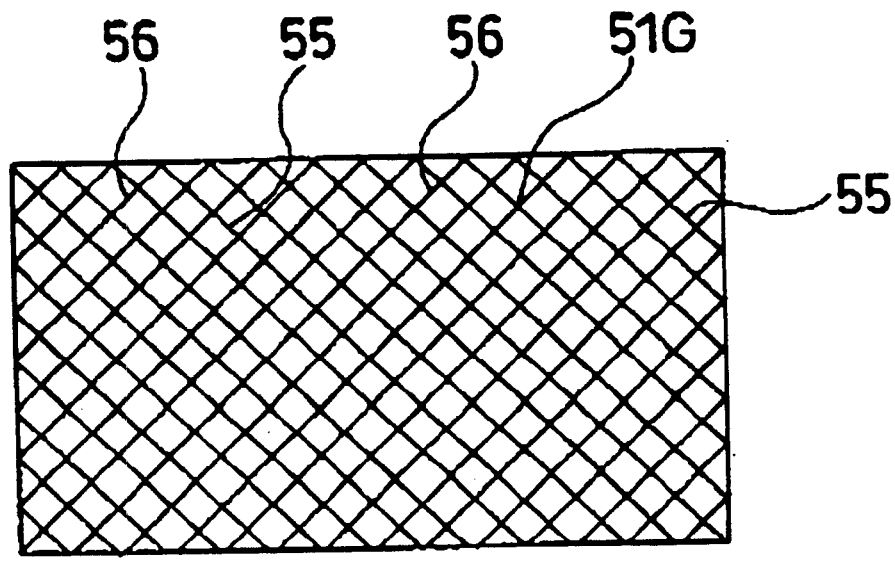
FIGS. 21(a) and 21(b) show another example of a method for evaluation of the mold piece, FIG. 21(a) being a plan view of the mold piece formed with a number of two kinds of marking-off lines whose marking-off depths are 5 $\mu$m and 1 $\mu$m respectively, and intersecting each other, which are formed on the surface, FIG. 21(b) being a plan view of the mold piece in which satin having rugged portions having a depth of 5 $\mu$m is formed on the surface.
Figure 21B:
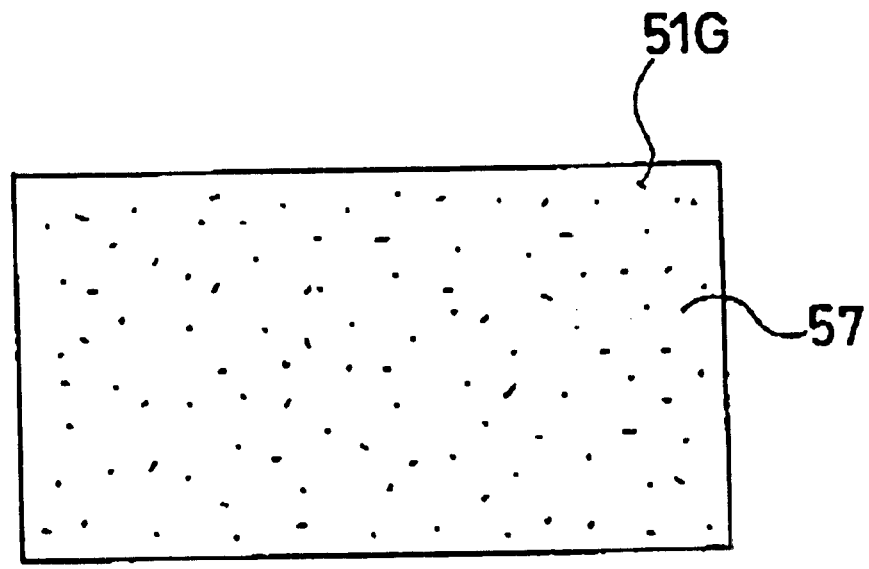

Further, as shown in FIG. 21(a), a number of marking-off lines 55, 56 intersecting each other are formed on the surfaces 51G of the mold pieces 51 to 53, and one marking-off line 55 has a marking-off depth of 1 $\mu$m while the other marking-off line 5 6 has a marking-off depth of 5 $\mu$m. Then, if the marking-off line 55 disappears due to the abrasion of the surfaces of the mold pieces 51 to 53 and only the marking-off line 56 can be visualized, there can be judged that the abrasion amount is within the range of 1 $\mu$m to 5 $\mu$m and it enables the evaluation of abrasion amount with high accuracy. Alternatively, a satin 57 having a concavo-convex of depth 5 $\mu$m may be formed on the surfaces 51G of the mold pieces 51 to 53 as shown in FIG. 21(b), and the abrasion amount of the surfaces 51C of the mold pieces 51 to 53 can be evaluated according to the presence of the satin 57.

By the constitution as described above, the surfaces 51G of the mold pieces 51 to 53 are also visualized to easily grasp the abrasion degree of the surfaces 51G quantitatively without removing the mold pieces 51 to 53 from the movable mold 50.

Further, with the mold body is placed on a three-dimensional measuring unit to measure the surface 51G of the mold piece, the abrasion of the surfaces of the mold piece also can be evaluated quantitatively without removing the mold piece from the movable mold 50.

It is noted that a surface luster measuring unit can be used to measure the luster of the surfaces 51G of the mold pieces. Thus, the abrasion of the surfaces of the mold piece also can be evaluated quasi-quantitatively without removing the mold pieces from the mold.

It is desirable that the method for evaluation of abrasion of the forming mold is used to quantitatively judge the progressing degree of the abrasion of the mold pieces 51 to 53 to reflect on the division of the mold pieces 35, 41, 42 of the forming mold for mass production 20, so as to plan the way of division, materials or the like of the mold pieces 35, 41, 42 of the forming mold for mass production 20.

While in the above-described embodiments of the invention, a description has been made only in the evaluation of the progressing degree of the abrasion for the mold pieces on the movable mold, it is to be noted that the present invention can be likewise applied to the evaluation of progressing degree of the mold pieces on the fixed mold. Further, while in the above-described embodiments of the invention, only the resin forming mold using resin as a material is described, it is to be noted of course that the present invention can be likewise applied to forming molds for metal material such as a casting mold using iron as material, a die-cast mold using non-ferrous metal as material, and the like.

Furthermore, while in the above-described embodiments of the invention, a description has been made of the evaluation of the abrasion of the mold pieces extending in the longitudinal direction of the molded part 1, it is to be noted that the present invention is not limited thereto but a conception of the piece includes the slide core 36 sliding in a direction perpendicular to the longitudinal direction of the molded part 1, the slide core 37 sliding in a longitudinal direction of the molded part 1, and loose core 38.

Moreover, while in the embodiments of the invention, the degree of abrasion of the surfaces of the mold pieces are evaluated directly, it is to be noted that the abrasion amount of the surface of the mold pieces can be evaluated indirectly by examining dimensions and inferior rates.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method for evaluation of abrasion of a forming mold, the method comprising the steps of:

preparing a plurality of molded parts for forming a cavity which produces a molded product;

dividing each of the molded parts into a plurality of divided pieces;

mounting the divided pieces on a forming mold body; and detecting abrasion of a surface of each of the divided pieces.

2. The method according to claim 1, wherein an amount of the abrasion of the surface of each of the divided pieces is detected with each of the divided pieces being removed from the forming mold body.

3. The method according to claim 1, wherein a layer having a thickness is formed on the surface of each of the divided pieces and whether or not the layer is removed is detected.

4. The method according to claim 1, wherein the surface of each of the divided pieces is provided with a plurality of layers of different colors to detect an abrasion amount of the surfaces of each of the divided pieces from a change in color resulting from a peeling of respective layers of the plurality of layers of different cooler.

5. The method according to claim 1, wherein a marking-off line is formed on the surface of each of the divided pieces and an amount of the abrasion of the surface of each of the divided pieces is detected upon a removal or disappearance of the marking-off line.

6. The method according to claim 1, wherein a satiny material having a predetermined depth of rugged portions is formed on the surface of each of the divided pieces and an amount of the abrasion of the surface of each of the divided pieces is detected upon a removal or disappearance of the satiny material.

7. The method according to claim 1, wherein each of the divided pieces is constituted of a different material.

8. The method according to claim 1, wherein each of the divided pieces is exchangeable.

9. The method according to claim 1, wherein the divided pieces are mounted on a movable mold.

* * * * *